(12) United States Patent
Ida

(10) Patent No.: US 9,052,495 B2
(45) Date of Patent: Jun. 9, 2015

(54) ZOOM LENS AND OPTICAL APPARATUS INCLUDING THE SAME

(71) Applicant: CANON KABUSHIKI KAISHA, Tokyo (JP)

(72) Inventor: Yoshiaki Ida, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/318,776

(22) Filed: Jun. 30, 2014

(65) Prior Publication Data

US 2015/0015966 A1     Jan. 15, 2015

(30) Foreign Application Priority Data

Jul. 10, 2013   (JP) .................................. 2013-144453

(51) Int. Cl.
*G02B 15/16*     (2006.01)
*G02B 15/14*     (2006.01)
*G02B 13/04*     (2006.01)

(52) U.S. Cl.
CPC ............... *G02B 15/14* (2013.01); *G02B 13/04* (2013.01); *G02B 15/16* (2013.01)

(58) Field of Classification Search
CPC .......................................... G02B 15/16–15/20

USPC .................. 359/676, 680–683, 686–688
See application file for complete search history.

(56) References Cited

U.S. PATENT DOCUMENTS

| 7,292,398 | B1 | 11/2007 | Misaka | |
|---|---|---|---|---|
| 7,864,453 | B2 | 1/2011 | Maetaki | |
| 8,203,799 | B2 | 6/2012 | Mihara et al. | |
| 2007/0139794 | A1* | 6/2007 | Misaka | 359/781 |
| 2008/0231962 | A1* | 9/2008 | Yamada | 359/649 |

* cited by examiner

*Primary Examiner* — Thomas K Pham
*Assistant Examiner* — Mitchell Oestreich
(74) *Attorney, Agent, or Firm* — Carter, DeLuca, Farrell & Schmidt, LLP

(57) ABSTRACT

Provided is a zoom lens in which a variation in aberration with respect to a temperature change is small and excellent optical characteristics can be easily obtained. The zoom lens includes multiple lens units in which a distance between adjacent ones of the multiple lens units changes for zooming. When an average value of a change in refractive index with respect to a temperature change within a temperature range of from 0° C. to 40° C. is $\Delta Nav$, at least one lens unit L of the multiple lens units includes multiple optical elements A made of materials satisfying a conditional expression: $|\Delta Nav|>5.0\times10^{-5}$. When an anomalous partial dispersion ratio for a g-line and an F-line is $\Delta\theta gF_{A\theta}$, at least one optical element $A_\theta$ of the multiple optical elements A satisfies a conditional expression: $|\Delta\theta g F_{A\theta}|>0.0272$.

11 Claims, 22 Drawing Sheets

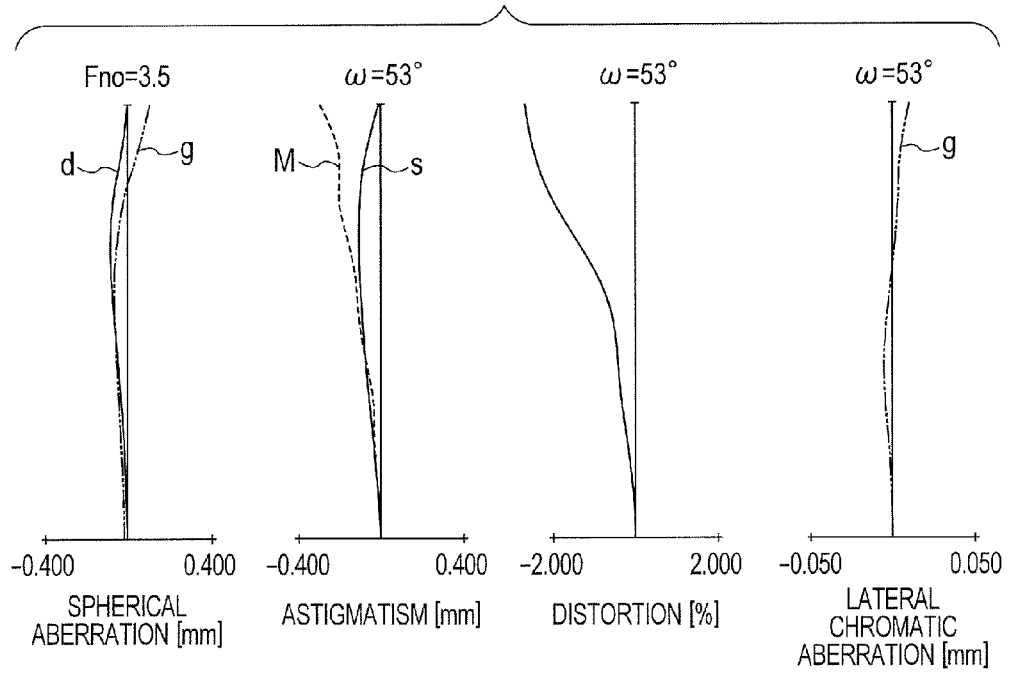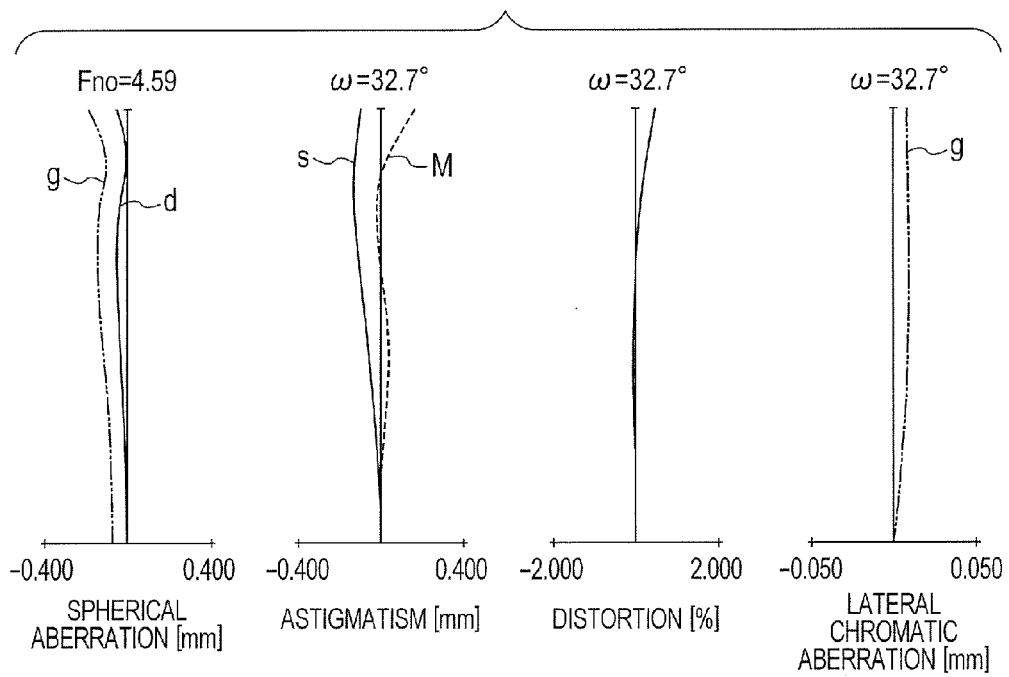

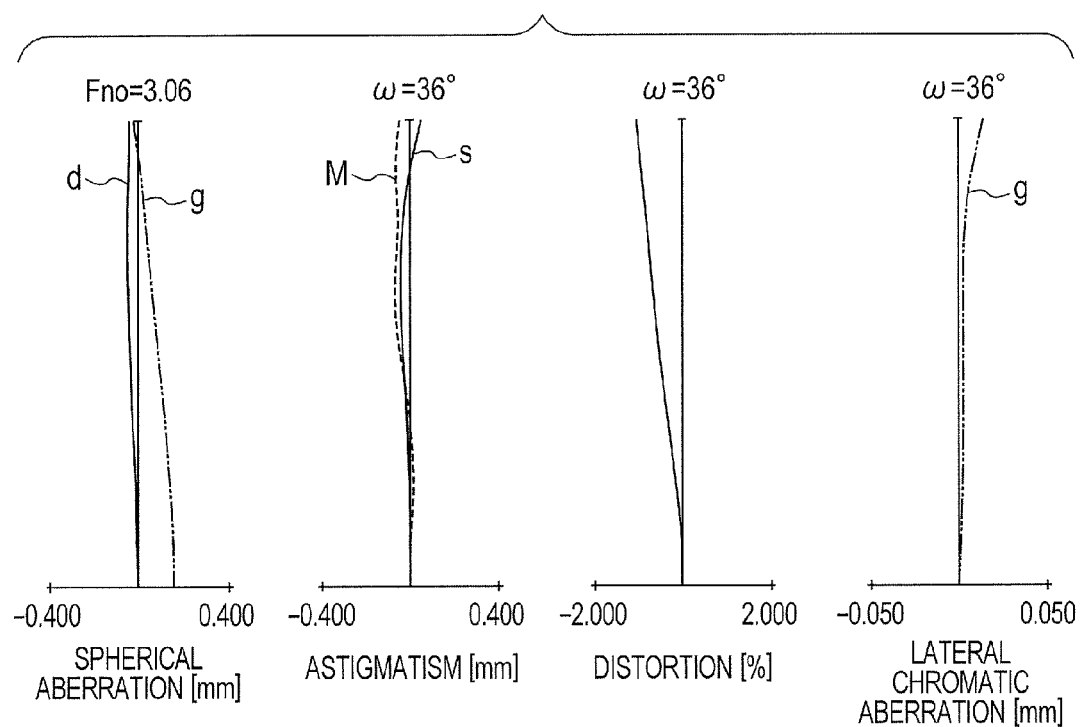
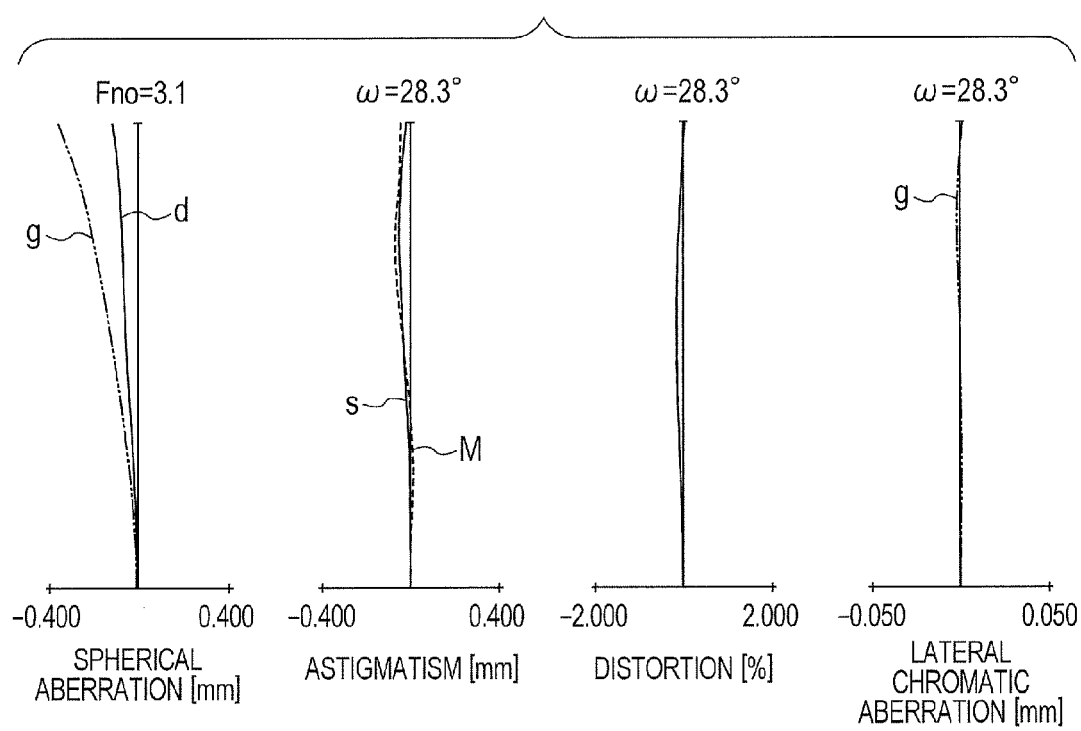

ZOOM LENS AND OPTICAL APPARATUS INCLUDING THE SAME

BACKGROUND OF THE INVENTION

1. Field of the Invention

The present invention relates to a zoom lens and an optical apparatus including the zoom lens, for example, to a zoom lens suitable for an optical apparatus such as a silver halide film camera, a digital still camera, a video camera, a telescope, binoculars, a projector, and a copying machine.

2. Description of the Related Art

A zoom lens to be used for an optical apparatus is required to have a short total lens length (length from a first lens surface on an object side to an image plane), a small optical system size as a whole, and high optical performance. Besides, the zoom lens is required to have a small change in optical performance even under an environmental change (temperature change, pressure change, humidity change, or the like). In general, when the entire system size is intended to be more reduced in the zoom lens, various aberrations, for example, chromatic aberrations such as an axial chromatic aberration and a lateral chromatic aberration frequently occur to greatly lower the optical performance. Moreover, a variation in aberration more frequently occurs in zooming. As a result, it becomes more difficult to obtain high optical performance over the entire zoom range.

An optical system using an optical element (lens) made of an optical material having a high anomalous partial dispersion characteristic, for example, an organic material, has been proposed to reduce the occurrence of the chromatic aberration among the various aberrations. In U.S. Pat. No. 7,292,398, the chromatic aberration is corrected in a well-balanced manner by providing an appropriate refractive power to an optical element made of an organic material having high anomalous dispersion and using an optical element made of another material. In this manner, the chromatic aberration of the entire system is reduced. Moreover, by using a solid material, the change in optical performance depending on a temperature is reduced as compared with the case where a liquid material is used.

In general, the organic material has a larger change in optical characteristics with respect to the environmental change such as the temperature change or the humidity change as compared with glass. In order to cope with the problem of the larger change in optical characteristics, there is known an optical system which corrects the chromatic aberration and reduces the variation in optical characteristics due to the environmental change by appropriately combining optical elements respectively made of multiple optical materials. In U.S. Pat. No. 7,864,453, the change in optical performance with respect to the temperature change is reduced by appropriately setting a focal length, an Abbe number of a material, and an anomalous partial dispersion characteristic of an optical element made of a resin having the anomalous partial dispersion characteristic, and a focal length and an Abbe number of a material of an optical element made of a resin without an anomalous partial dispersion characteristic. In U.S. Pat. No. 8,203,799, a variation in the chromatic aberration is reduced by appropriately using a refractive index and an Abbe number of an organic material for setting.

SUMMARY OF THE INVENTION

According to one embodiment of the present invention, there is provided a zoom lens, including multiple lens units in which a distance between adjacent ones of the multiple lens units changes for zooming, in which:

when an average value of a change in refractive index with respect to a temperature change within a temperature range of from 0° C. to 40° C. is ΔNav, at least one lens unit L of the multiple lens units includes multiple optical elements A made of materials satisfying the following conditional expression:

$$|\Delta Nav|>5.0\times10^{-5};$$

when an anomalous partial dispersion ratio for a g-line and an F-line is $\Delta\theta gF_{A\theta}$, at least one optical element $A_\theta$ of the multiple optical elements A satisfies the following conditional expression:

$$|\Delta\theta gF_{A\theta}|>0.0272; \text{ and}$$

when i indicates an order of the at least one optical element $A_\theta$ in the at least one lens unit L counted from a light incident side, an i-th optical element $A_\theta$ in the at least one lens unit L counted from the light incident side is an i-th optical element, j indicates an order of the multiple optical elements A in the at least one lens unit L counted from the light incident side, a j-th optical element A in the at least one lens unit L counted from the light incident side is a j-th optical element, a focal length of the i-th optical element is fi, a focal length of the at least one lens unit L is fL, an average value of a change in a refractive power ϕpj of a positive lens of the j-th optical element with respect to the temperature change within the temperature range of from 0° C. to 40° C. is Δϕpj, and an average value of a change in a refractive power ϕnj of a negative lens of the j-th optical element with respect to the temperature change within the temperature range of from 0° C. to 40° C. is Δϕnj, the following conditional expressions are satisfied:

$$|1/(\Sigma(1/fi)\times fL)|<2.2; \text{ and}$$

$$-1.5<\Sigma(\Delta\phi pj)/\Sigma(\Delta\phi nj)<-0.66.$$

Further features of the present invention will become apparent from the following description of exemplary embodiments with reference to the attached drawings.

BRIEF DESCRIPTION OF THE DRAWINGS

FIG. 1 is a lens sectional view when an object distance of a zoom lens according to a first embodiment of the present invention is at infinity.

FIG. 2A is an aberration chart at a wide angle end when the object distance of the zoom lens according to the first embodiment is at infinity at an environmental temperature of 23° C.

FIG. 2B is an aberration chart at a telephoto end when the object distance of the zoom lens according to the first embodiment is at infinity at the environmental temperature of 23° C.

FIG. 3A is an aberration chart at the wide angle end when the object distance of the zoom lens according to the first embodiment is at infinity at the environmental temperature of 40° C.

FIG. 3B is an aberration chart at the telephoto end when the object distance of the zoom lens according to the first embodiment is at infinity at the environmental temperature of 40° C.

FIG. 4A is an aberration chart at the wide angle end when the object distance of the zoom lens according to the first embodiment is at infinity at the environmental temperature of −10° C.

FIG. 4B is an aberration chart at the telephoto end when the object distance of the zoom lens according to the first embodiment is at infinity at the environmental temperature of −10° C.

FIG. 5 is a lens sectional view when an object distance of a zoom lens according to a second embodiment of the present invention is at infinity.

FIG. 12A is an aberration chart at the wide angle end when the object distance of the zoom lens according to the third embodiment is at infinity at the environmental temperature of −10° C.

FIG. 12B is an aberration chart at the telephoto end when the object distance of the zoom lens according to the third embodiment is at infinity at the environmental temperature of −10° C.

DESCRIPTION OF THE EMBODIMENTS

Preferred embodiments of the present invention will now be described in detail in accordance with the accompanying drawings.

A zoom lens and an optical apparatus having the zoom lens according to the present invention are described. The zoom lens according to the present invention includes multiple lens units. For zooming, a distance between the adjacent lens units changes. An average value of a change in refractive index with respect to a temperature change within a temperature range from 0° C. to 40° C. is set to $\Delta \text{Nav}$. In this case, at least one lens unit L among the multiple lens units includes multiple optical elements A respectively made of materials which satisfy a conditional expression:

$$|\Delta N av| > 5.0 \times 10^{-5} \tag{1}$$

When an anomalous partial dispersion ratio for a g-line and an F-line is $\Delta\theta F_{A\theta}$, at least one optical element $A_\theta$ among the multiple optical elements A satisfies a conditional expression:

$$|\Delta\theta g F_{A\theta}| > 0.0272 \tag{2}$$

Figure 1:
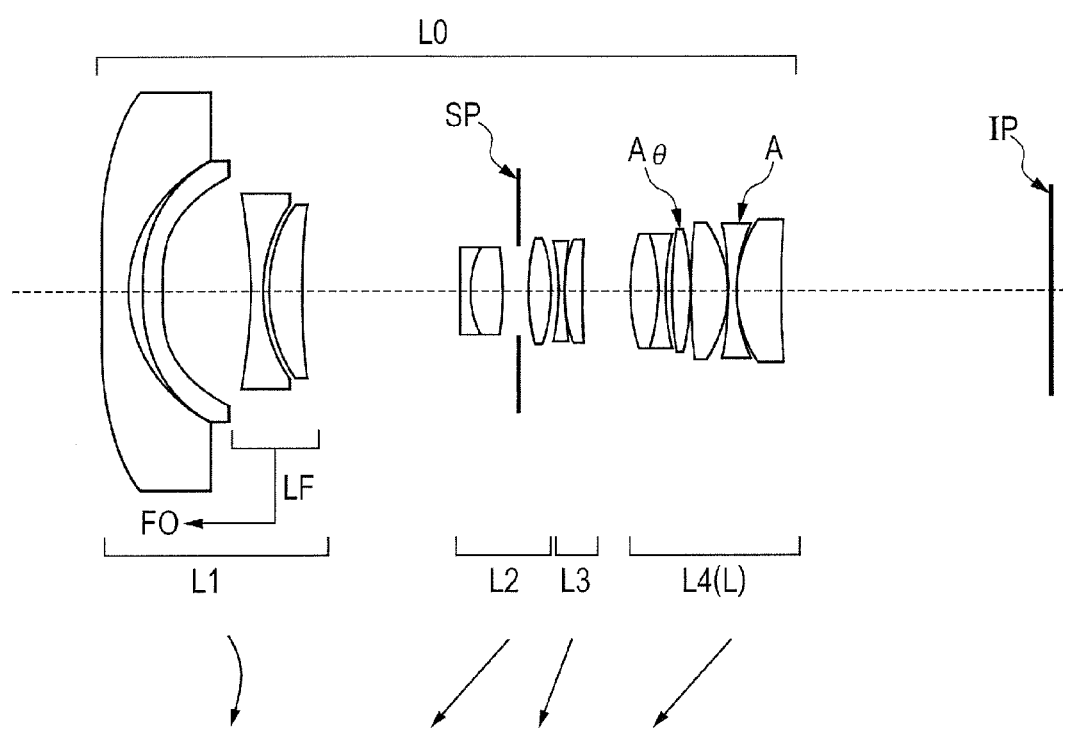
Figure 2A:
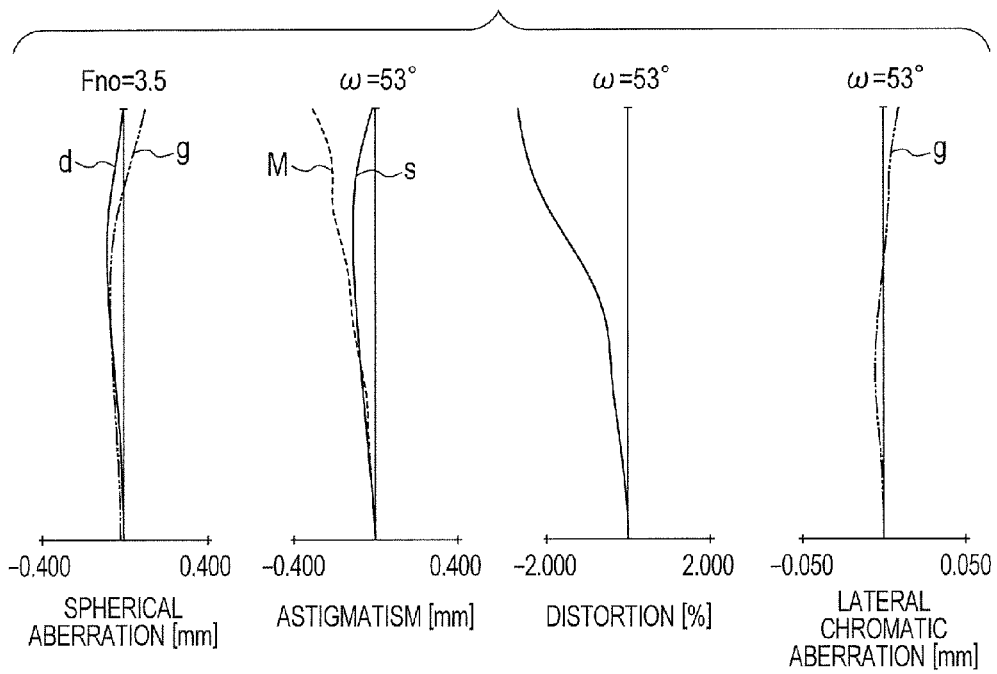
Figure 2B:
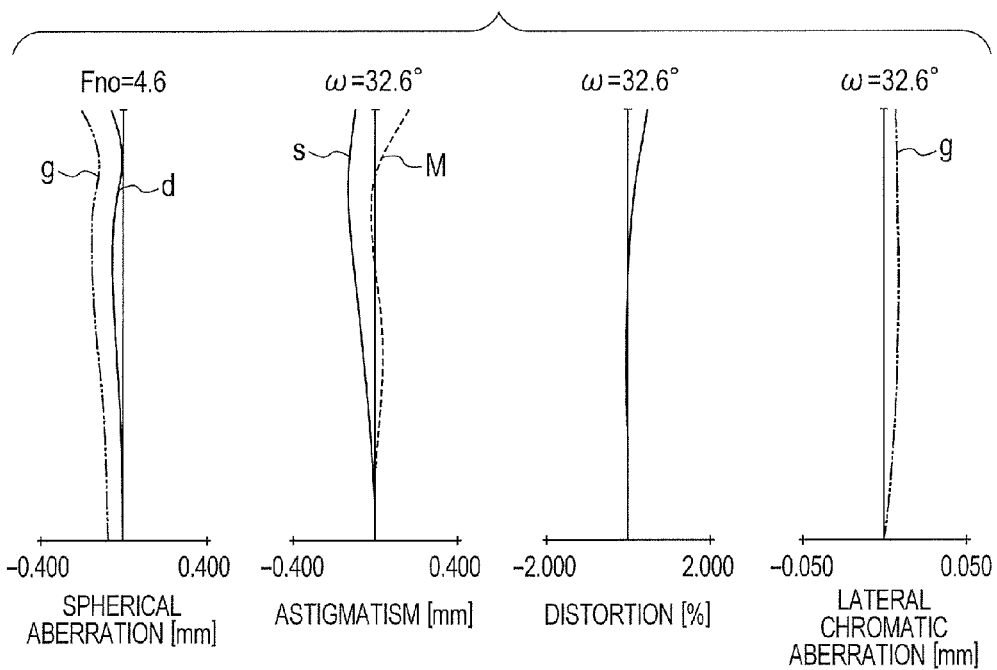
Figure 4A:
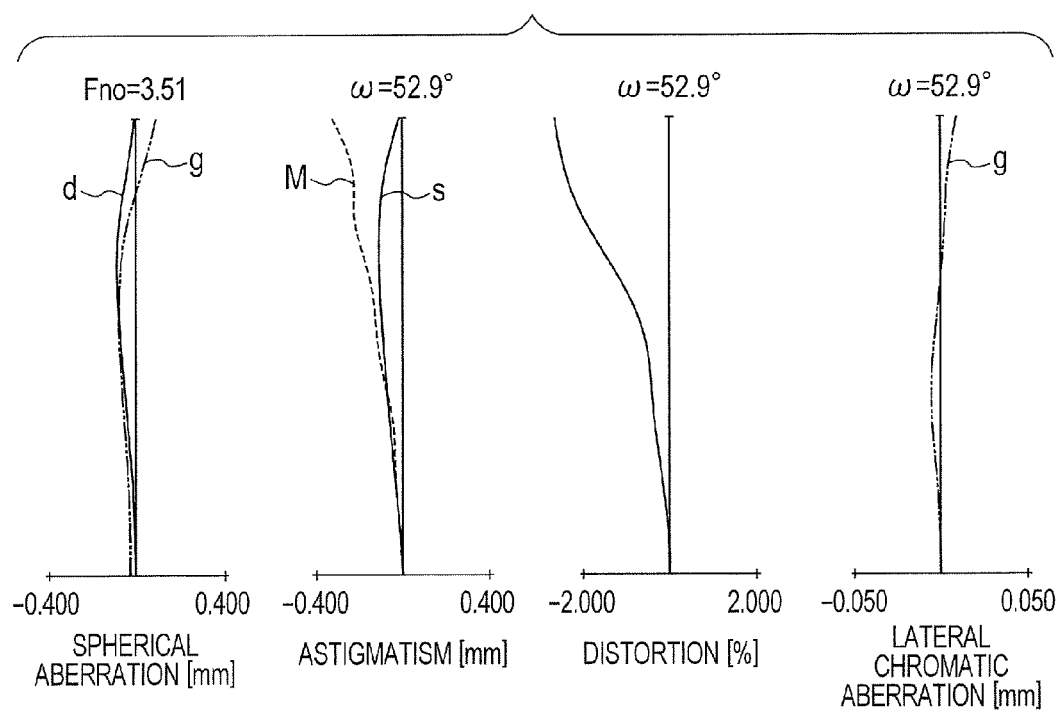
Figure 4B:
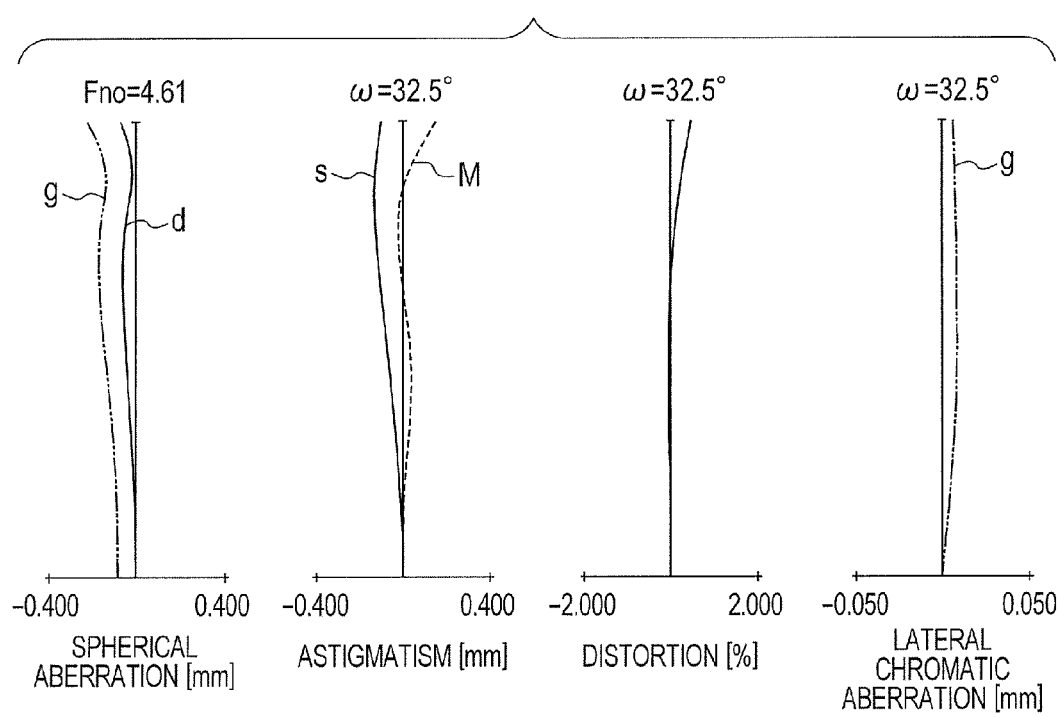

FIG. 1 is a lens sectional view at a wide angle end of a zoom lens according to a first embodiment of the present invention. FIG. 2A is an aberration chart at the wide angle end and FIG. 2B is an aberration chart at a telephoto end when an object distance of the zoom lens according to the first embodiment is at infinity at an environmental temperature of 23° C. FIG. 3A is an aberration chart at the wide angle end and FIG. 3B is an aberration chart at the telephoto end when the object distance of the zoom lens according to the first embodiment is at infinity at the environmental temperature of 40° C. FIG. 4A is an aberration chart at the wide angle end and FIG. 4B is an aberration chart at the telephoto end when the object distance of the zoom lens according to the first embodiment is at infinity at the environmental temperature of −10° C.

Figure 5:
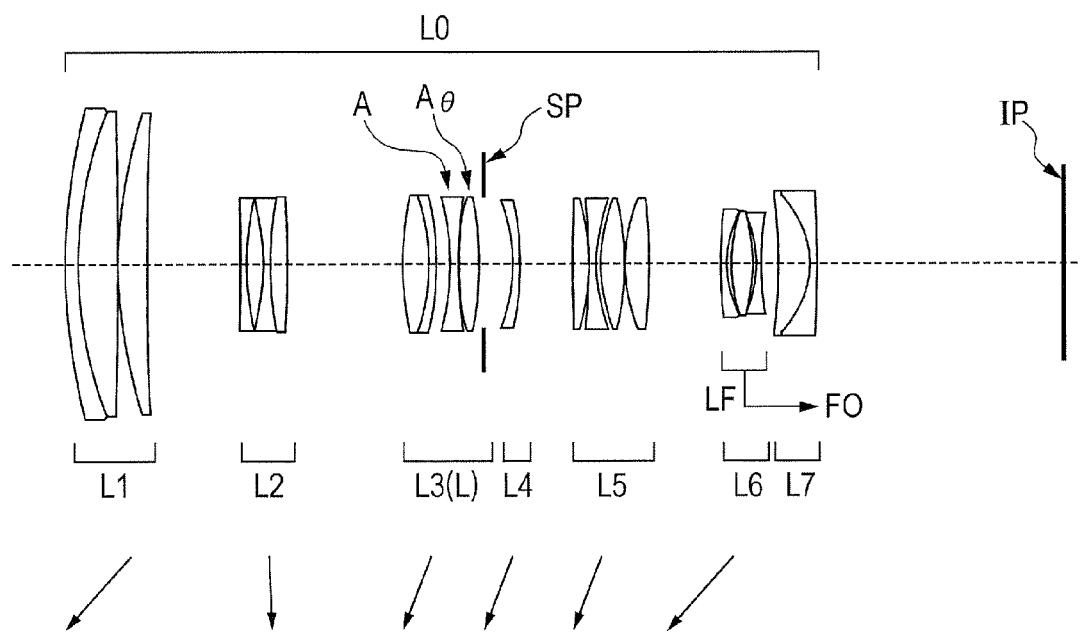
Figure 6A:
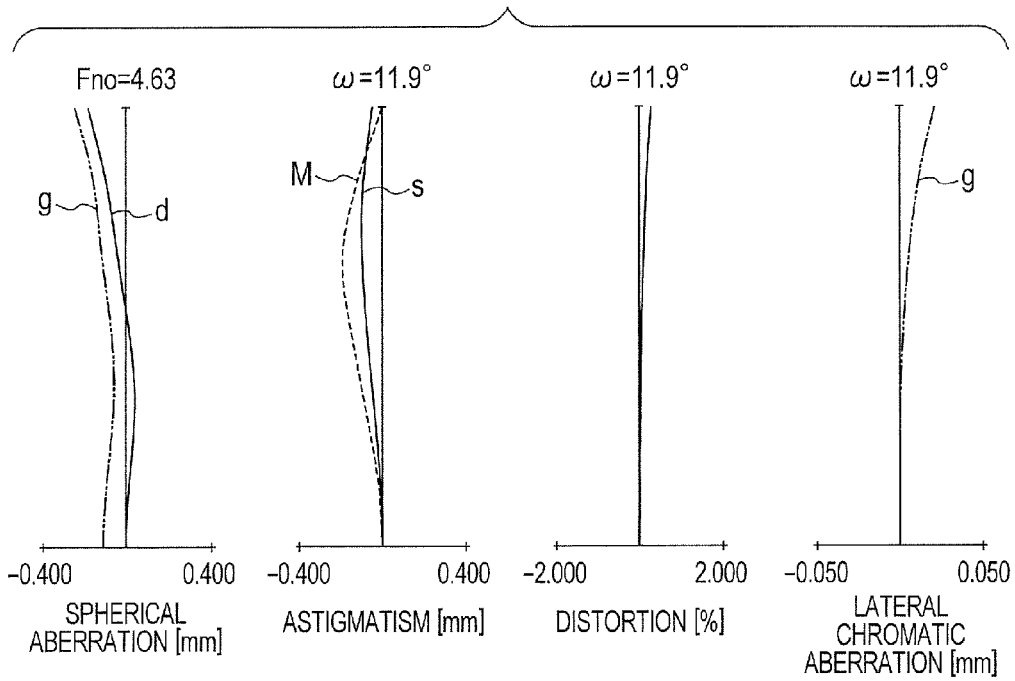
FIG. 6A is an aberration chart at a wide angle end when the object distance of the zoom lens according to the second embodiment is at infinity at an environmental temperature of 23° C.
Figure 6B:
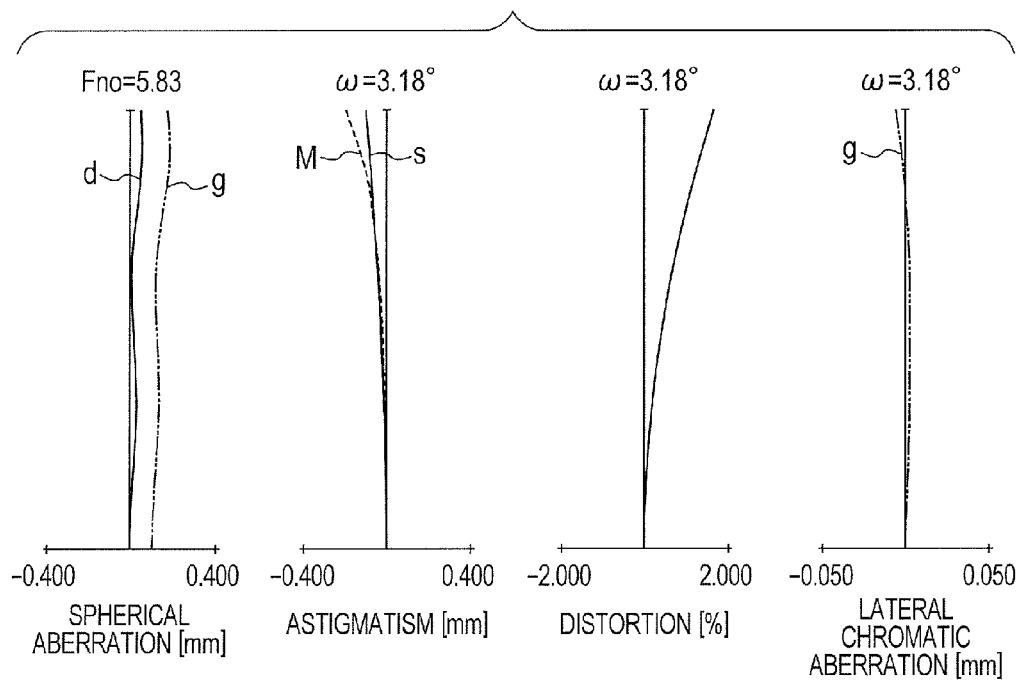
FIG. 6B is an aberration chart at a telephoto end when the object distance of the zoom lens according to the second embodiment is at infinity at the environmental temperature of 23° C.
Figure 7A:
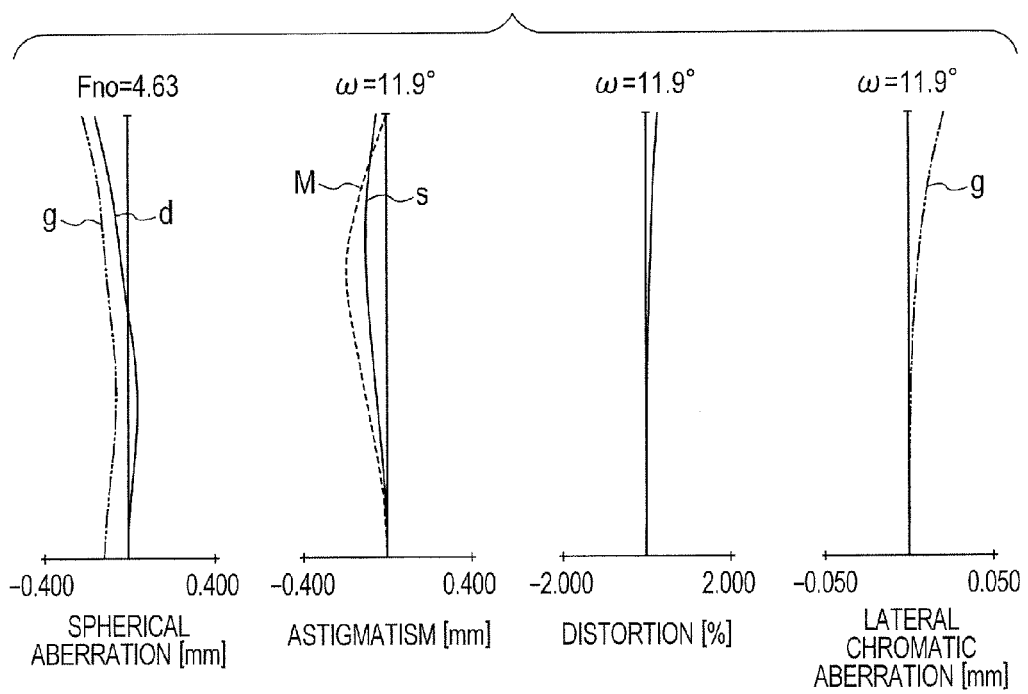
FIG. 7A is an aberration chart at the wide angle end when the object distance of the zoom lens according to the second embodiment is at infinity at the environmental temperature of 40° C.
Figure 7B:
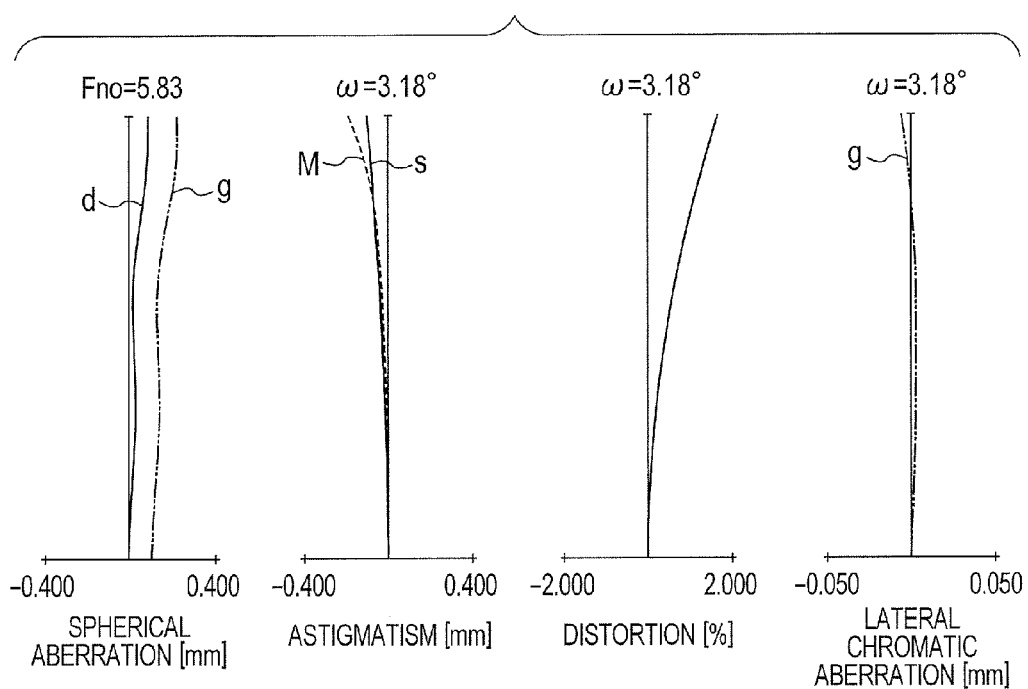
FIG. 7B is an aberration chart at the telephoto end when the object distance of the zoom lens according to the second embodiment is at infinity at the environmental temperature of 40° C.
Figure 8A:
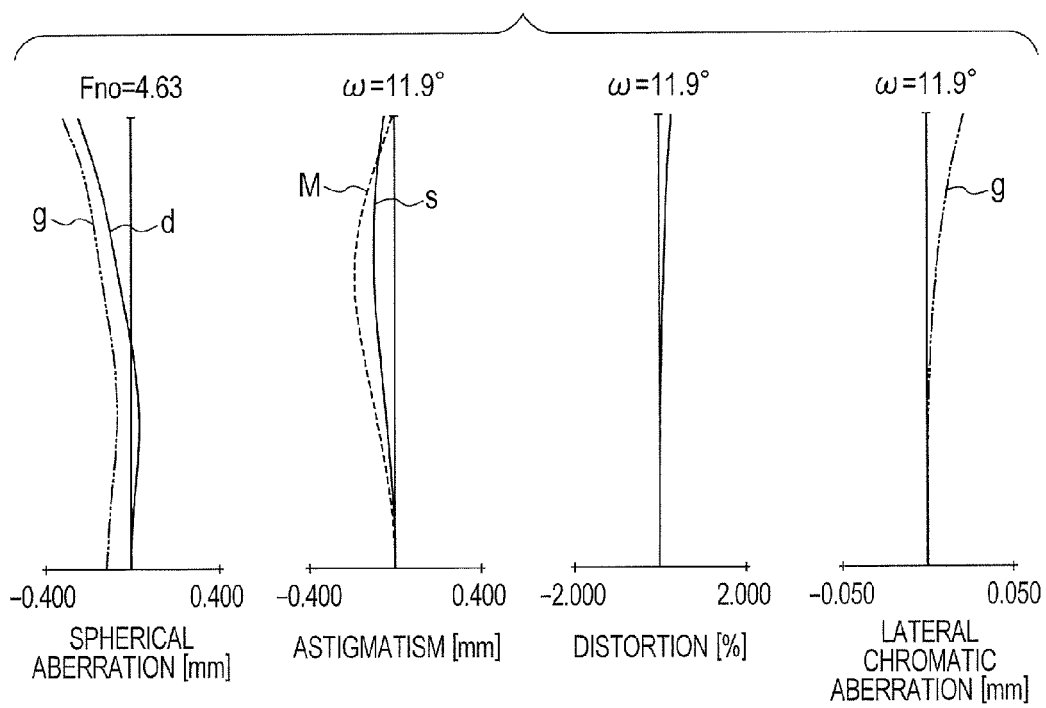
FIG. 8A is an aberration chart at the wide angle end when the object distance of the zoom lens according to the second embodiment is at infinity at the environmental temperature of −10° C.
Figure 8B:
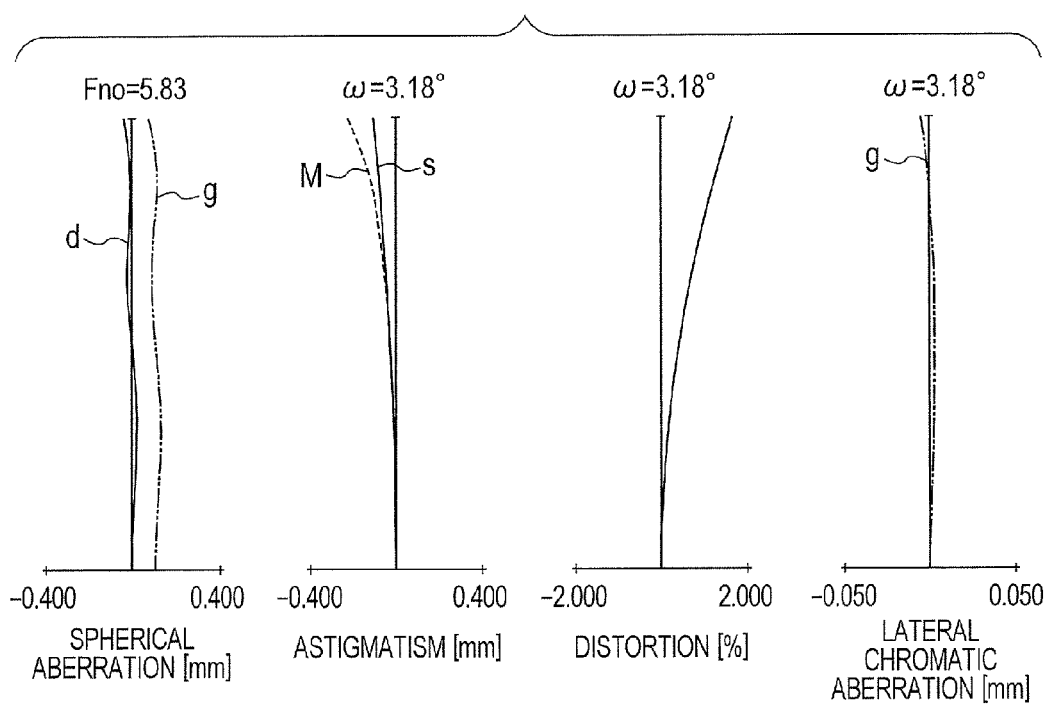
FIG. 8B is an aberration chart at the telephoto end when the object distance of the zoom lens according to the second embodiment is at infinity at the environmental temperature of −10° C.

FIG. 5 is a lens sectional view at a wide angle end of a zoom lens according to a second embodiment of the present invention. FIG. 6A is an aberration chart at the wide angle end and FIG. 6B is an aberration chart at a telephoto end when an object distance of the zoom lens according to the second embodiment is at infinity at an environmental temperature of 23° C. FIG. 7A is an aberration chart at the wide angle end and FIG. 7B is an aberration chart at the telephoto end when the object distance of the zoom lens according to the second embodiment is at infinity at the environmental temperature of 40° C. FIG. 8A is an aberration chart at the wide angle end and FIG. 8B is an aberration chart at the telephoto end when the object distance of the zoom lens according to the second embodiment is at infinity at the environmental temperature of −10° C.

Figure 9:
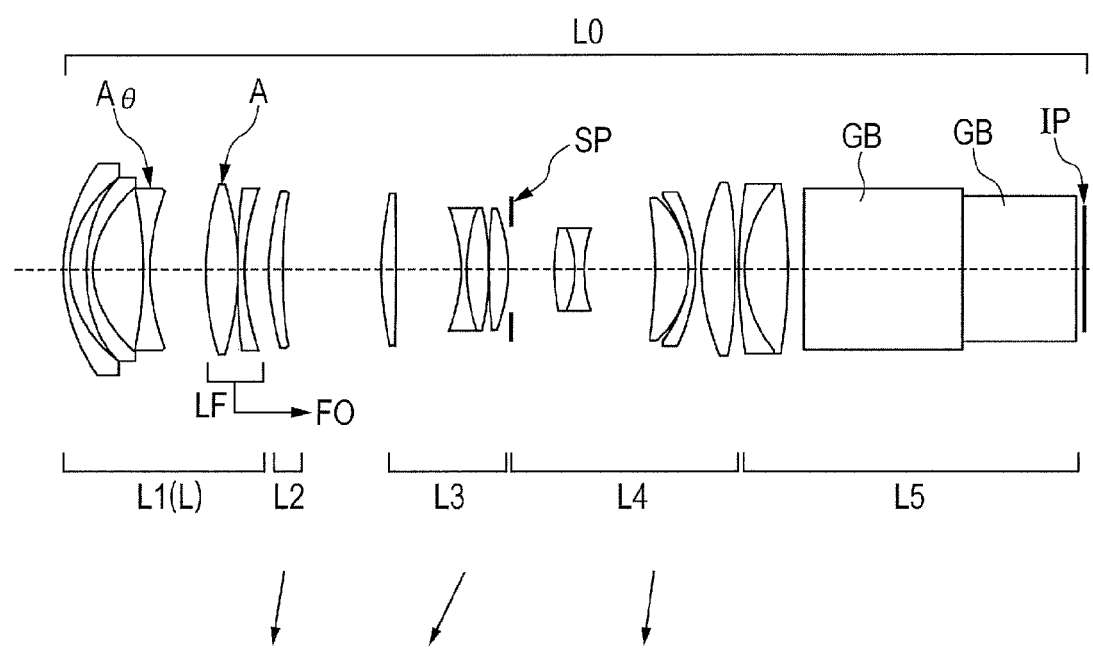
FIG. 9 is a lens sectional view when an object distance of a zoom lens according to a third embodiment of the present invention is at infinity.
Figure 10A:
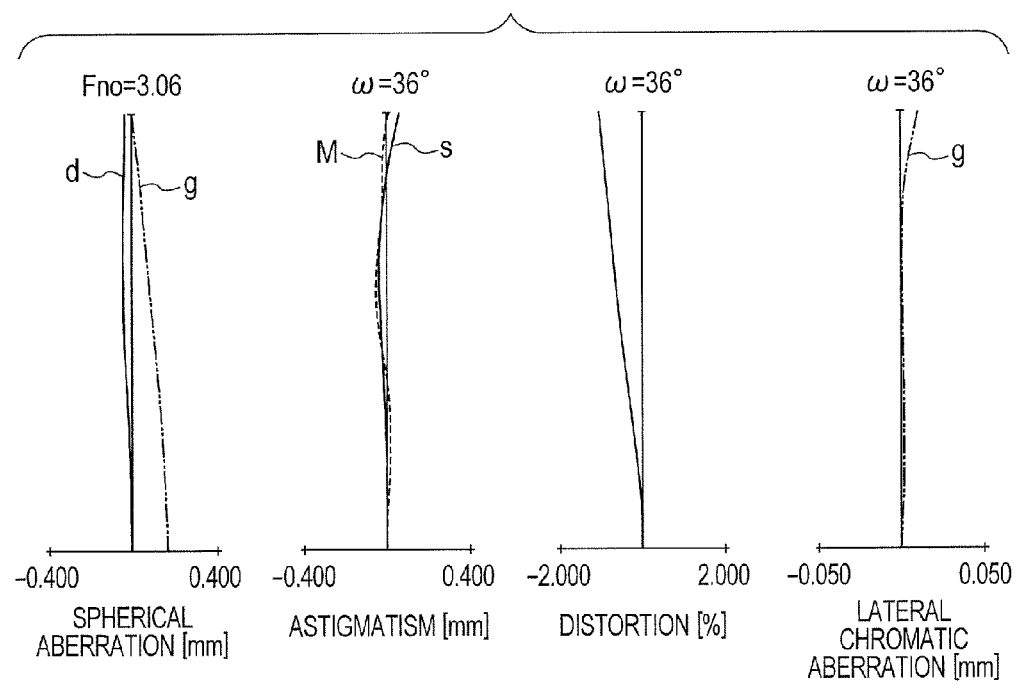
FIG. 10A is an aberration chart at a wide angle end when the object distance of the zoom lens according to the third embodiment is at infinity at an environmental temperature of 23° C.
Figure 10B:
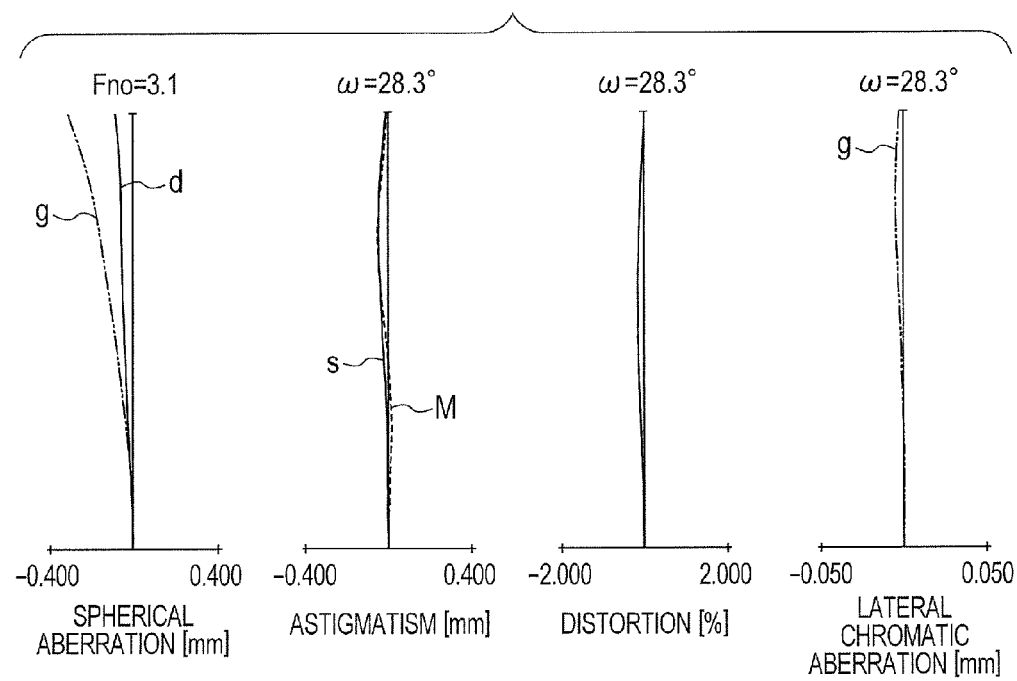
FIG. 10B is an aberration chart at a telephoto end when the object distance of the zoom lens according to the third embodiment is at infinity at the environmental temperature of 23° C.
Figure 11A:
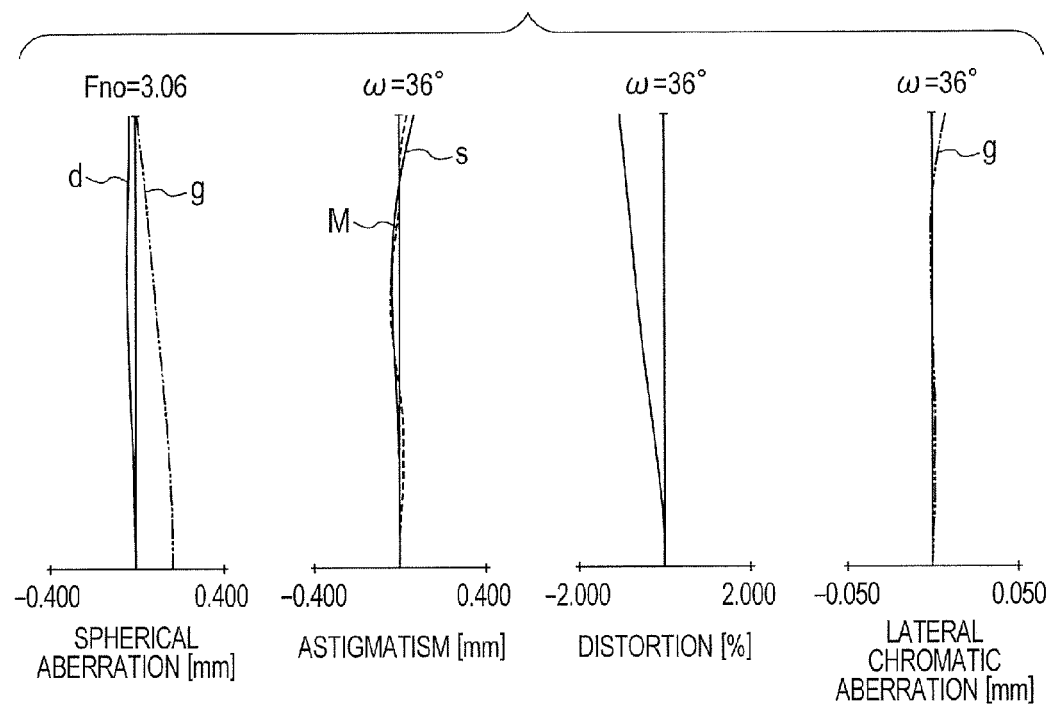
FIG. 11A is an aberration chart at the wide angle end when the object distance of the zoom lens according to the third embodiment is at infinity at the environmental temperature of 40° C.
Figure 11B:
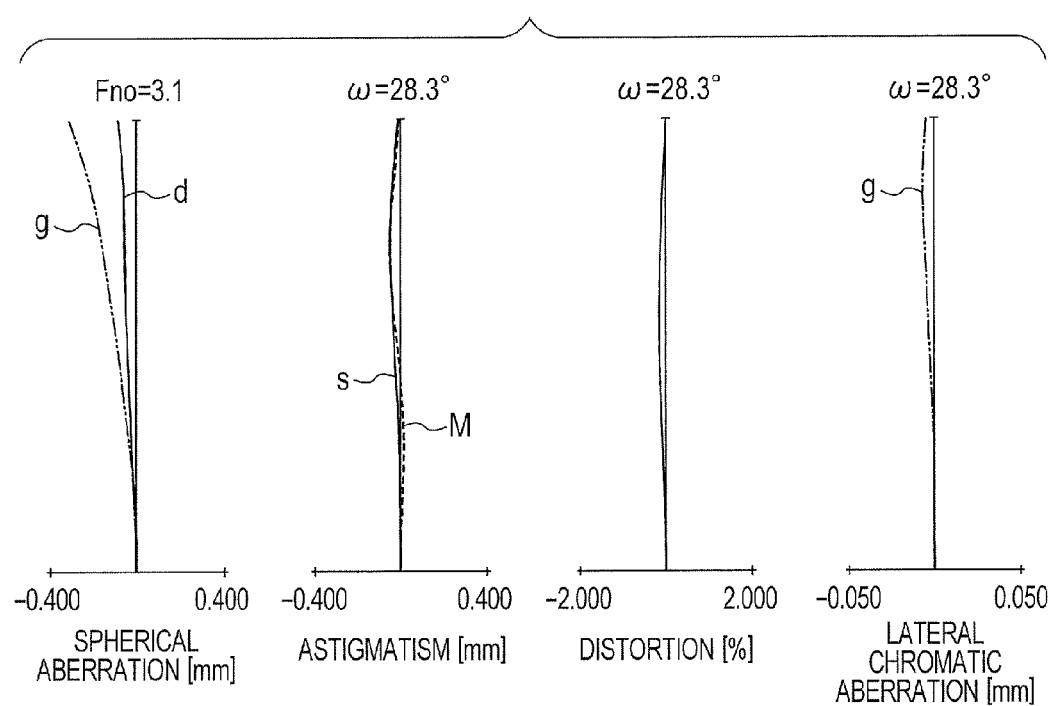
FIG. 11B is an aberration chart at the telephoto end when the object distance of the zoom lens according to the third embodiment is at infinity at the environmental temperature of 40° C.

FIG. 9 is a lens sectional view at a wide angle end of a zoom lens according to a third embodiment of the present invention. FIG. 10A is an aberration chart at the wide angle end and FIG. 10B is an aberration chart at a telephoto end when an object distance of the zoom lens according to the third embodiment is at infinity at an environmental temperature of 23° C. FIG. 11A is an aberration chart at the wide angle end and FIG. 11B is an aberration chart at the telephoto end when the object distance of the zoom lens according to the third embodiment is at infinity at the environmental temperature of 40° C. FIG. 12A is an aberration chart at the wide angle end and FIG. 12B is an aberration chart at the telephoto end when the object distance of the zoom lens according to the third embodiment is at infinity at the environmental temperature of −10° C.

Figure 13:
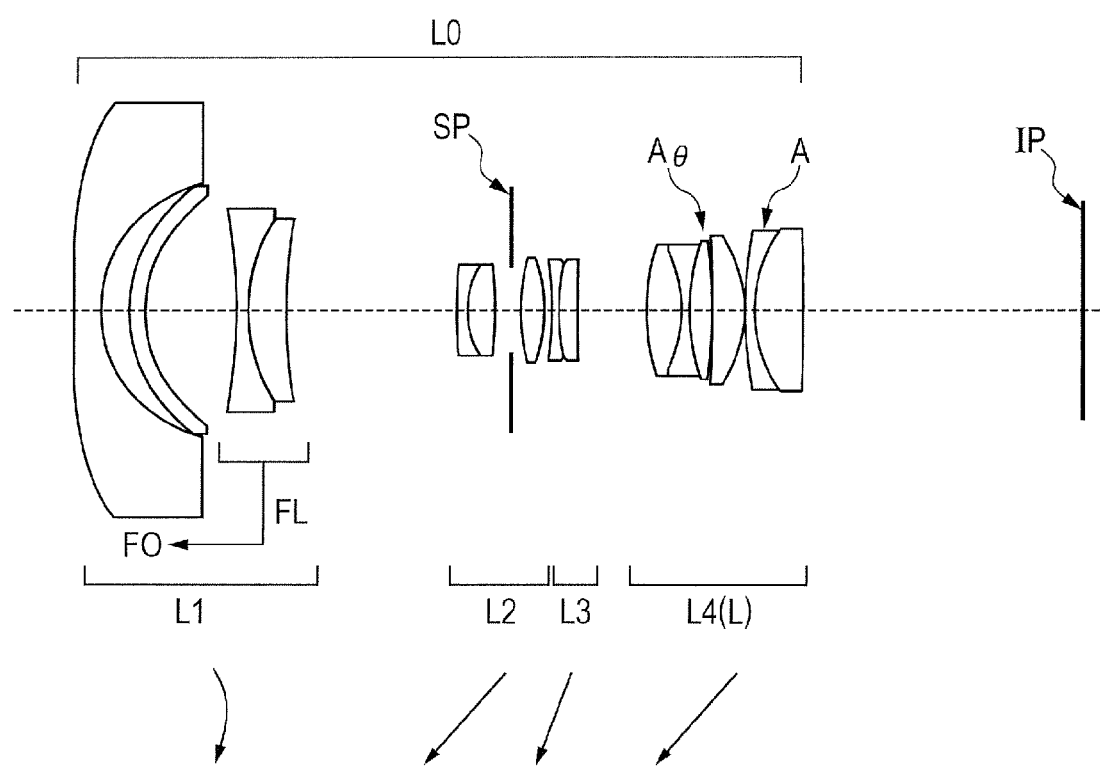
FIG. 13 is a lens sectional view when an object distance of a zoom lens according to a fourth embodiment of the present invention is at infinity.
Figure 14A:
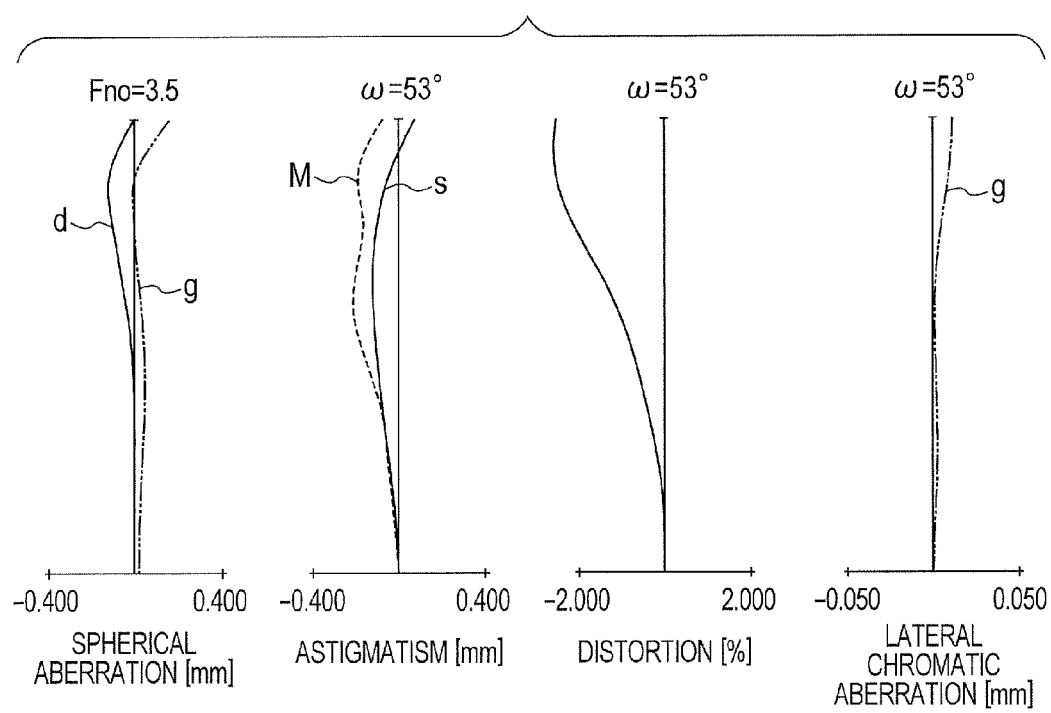
FIG. 14A is an aberration chart at a wide angle end when the object distance of the zoom lens according to the fourth embodiment is at infinity at an environmental temperature of 23° C.
Figure 14B:
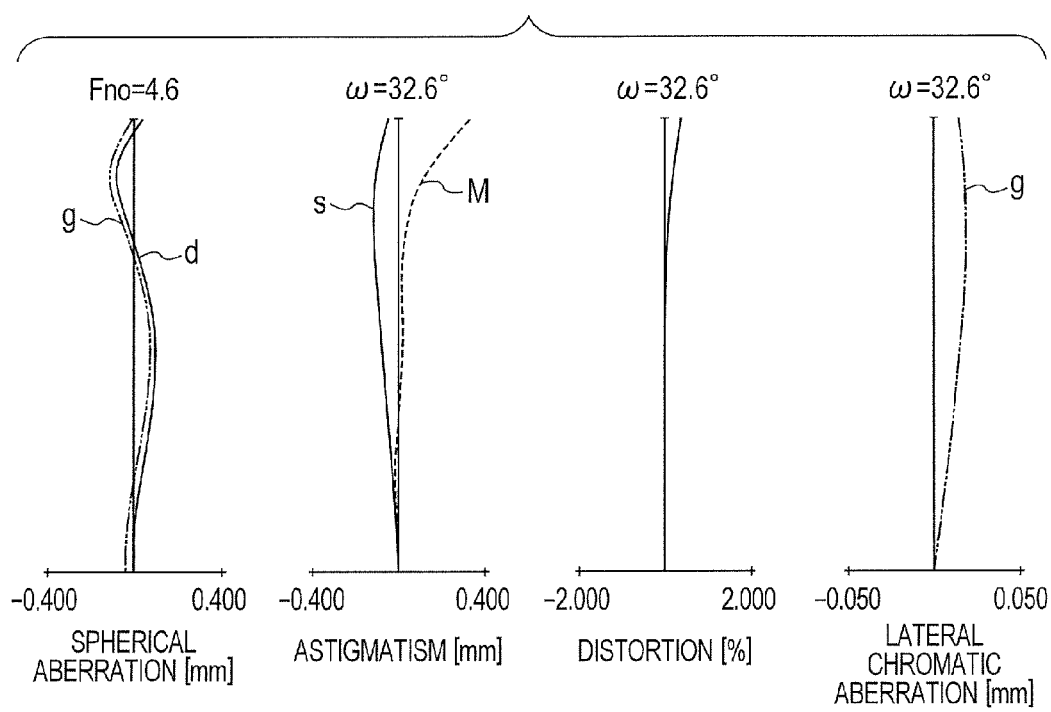
FIG. 14B is an aberration chart at a telephoto end when the object distance of the zoom lens according to the fourth embodiment is at infinity at the environmental temperature of 23° C.
Figure 15A:
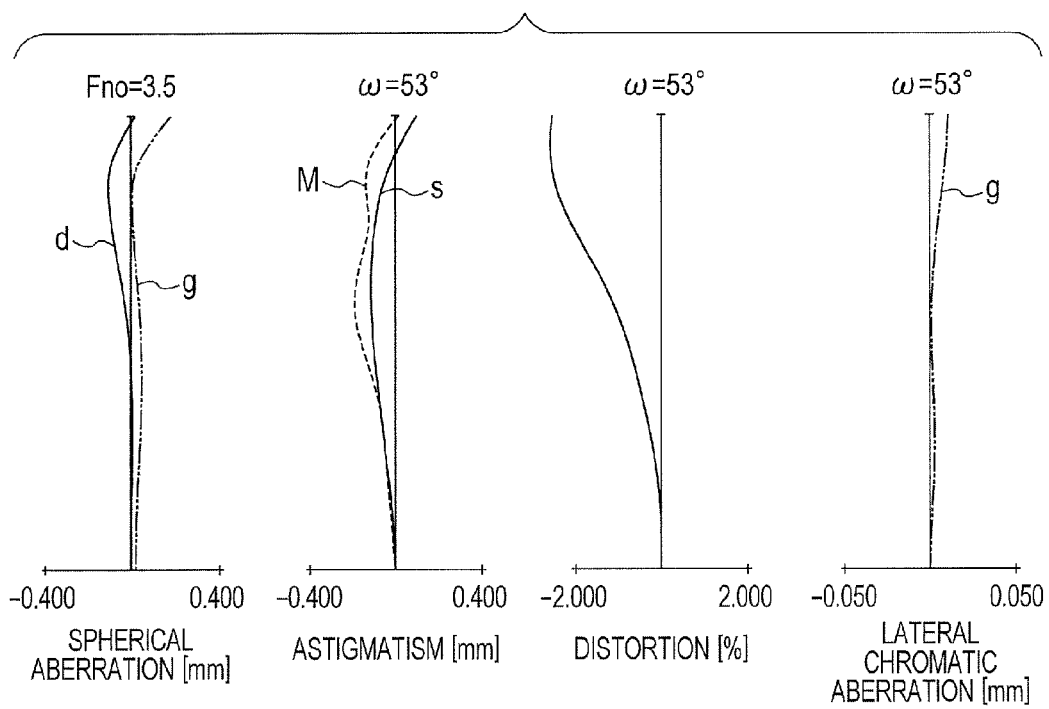
FIG. 15A is an aberration chart at the wide angle end when the object distance of the zoom lens according to the fourth embodiment is at infinity at the environmental temperature of 40° C.
Figure 15B:
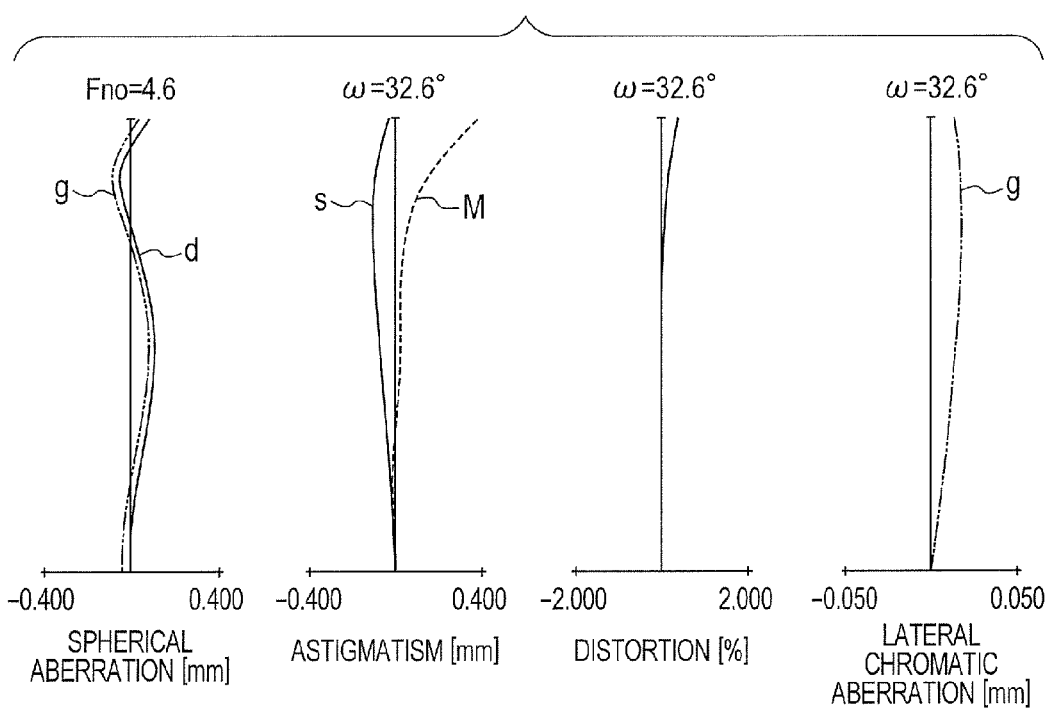
FIG. 15B is an aberration chart at the telephoto end when the object distance of the zoom lens according to the fourth embodiment is at infinity at the environmental temperature of 40° C.
Figure 16A:
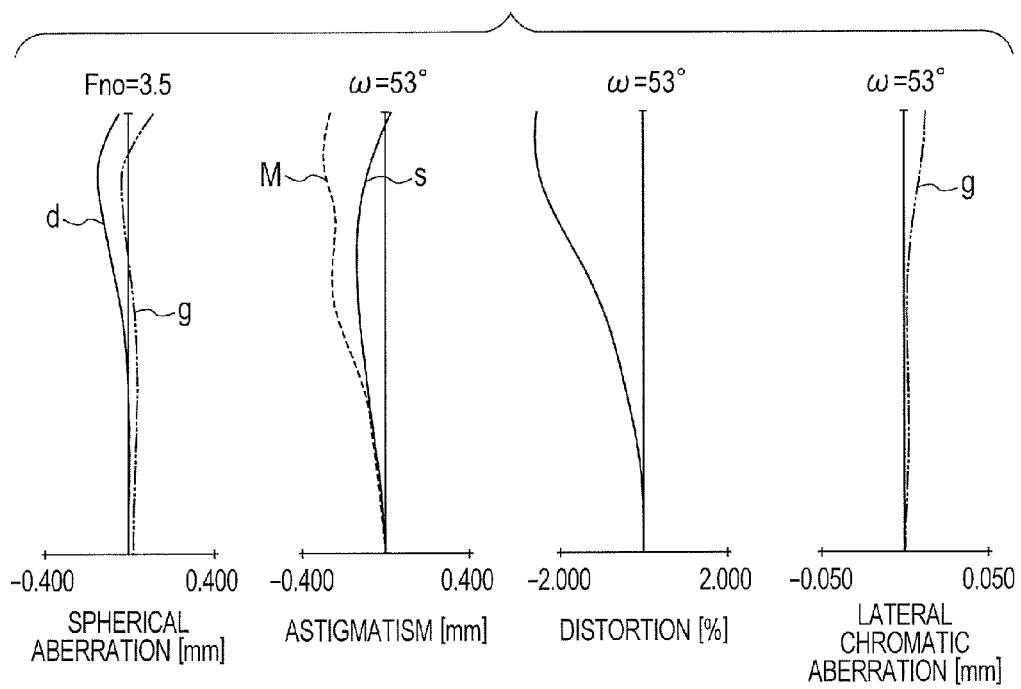
FIG. 16A is an aberration chart at the wide angle end when the object distance of the zoom lens according to the fourth embodiment is at infinity at the environmental temperature of −10° C.
Figure 16B:
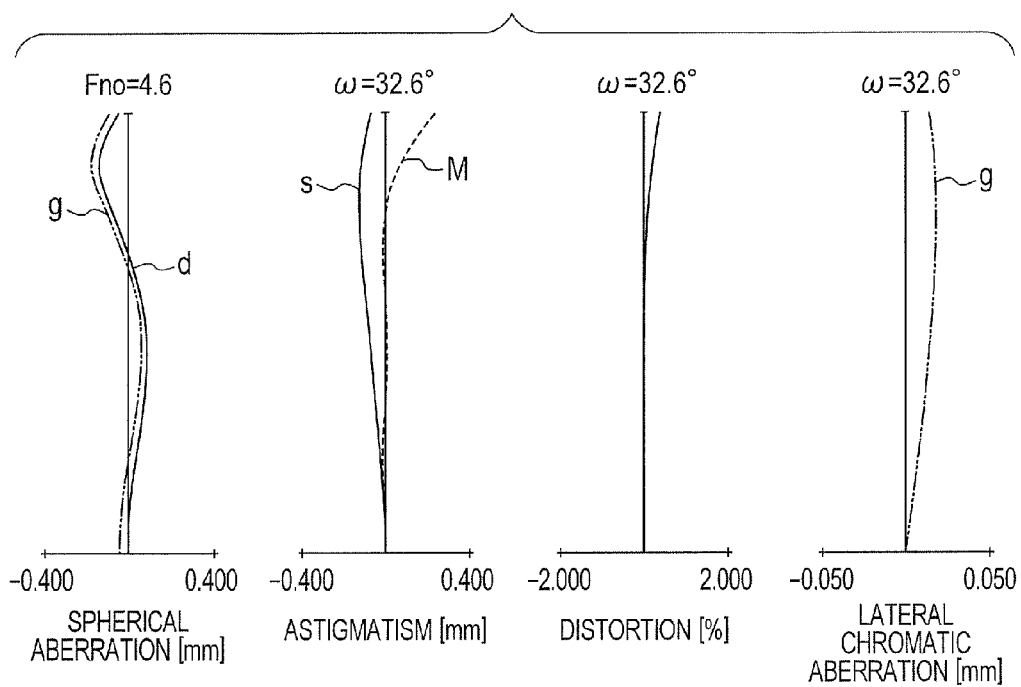
FIG. 16B is an aberration chart at the telephoto end when the object distance of the zoom lens according to the fourth embodiment is at infinity at the environmental temperature of −10° C.

FIG. 13 is a lens sectional view at a wide angle end of a zoom lens according to a fourth embodiment of the present invention. FIG. 14A is an aberration chart at the wide angle end and FIG. 14B is an aberration chart at a telephoto end when an object distance of the zoom lens according to the fourth embodiment is at infinity at an environmental temperature of 23° C. FIG. 15A is an aberration chart at the wide angle end and FIG. 15B is an aberration chart at the telephoto end when the object distance of the zoom lens according to the fourth embodiment is at infinity at the environmental temperature of 40° C. FIG. 16A is an aberration chart at the wide angle end and FIG. 16B is an aberration chart at the telephoto end when the object distance of the zoom lens according to the fourth embodiment is at infinity at the environmental temperature of −10° C.

Figure 17:
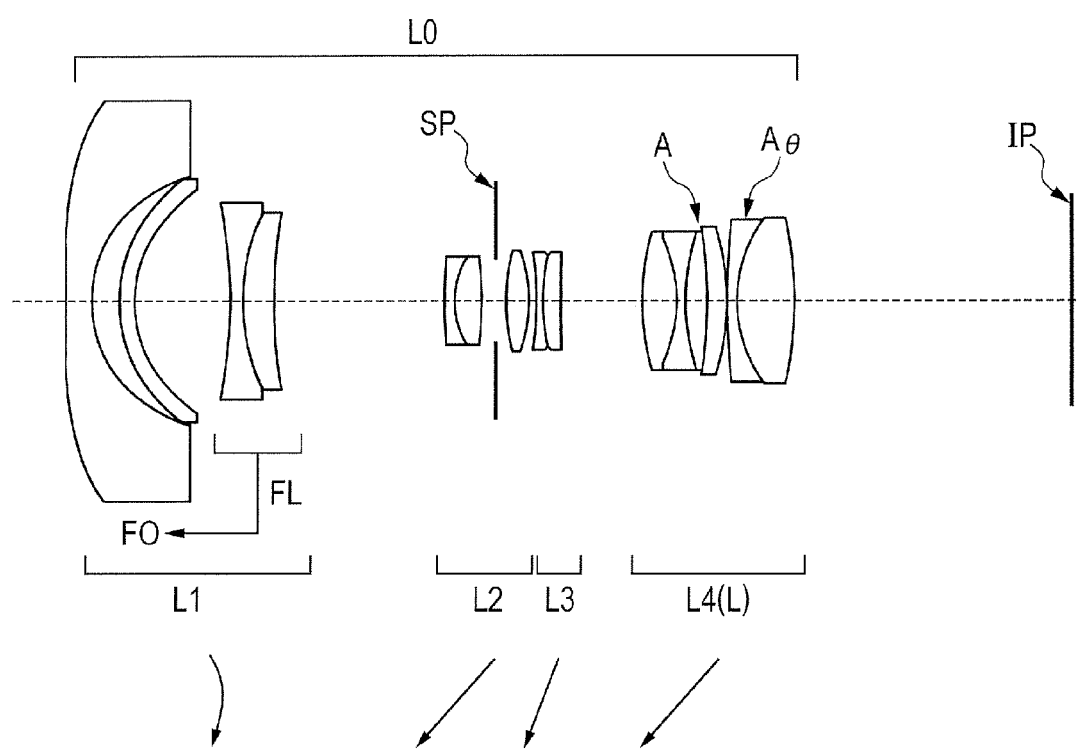
FIG. 17 is a lens sectional view when an object distance of a zoom lens according to a fifth embodiment of the present invention is at infinity.
Figure 18A:
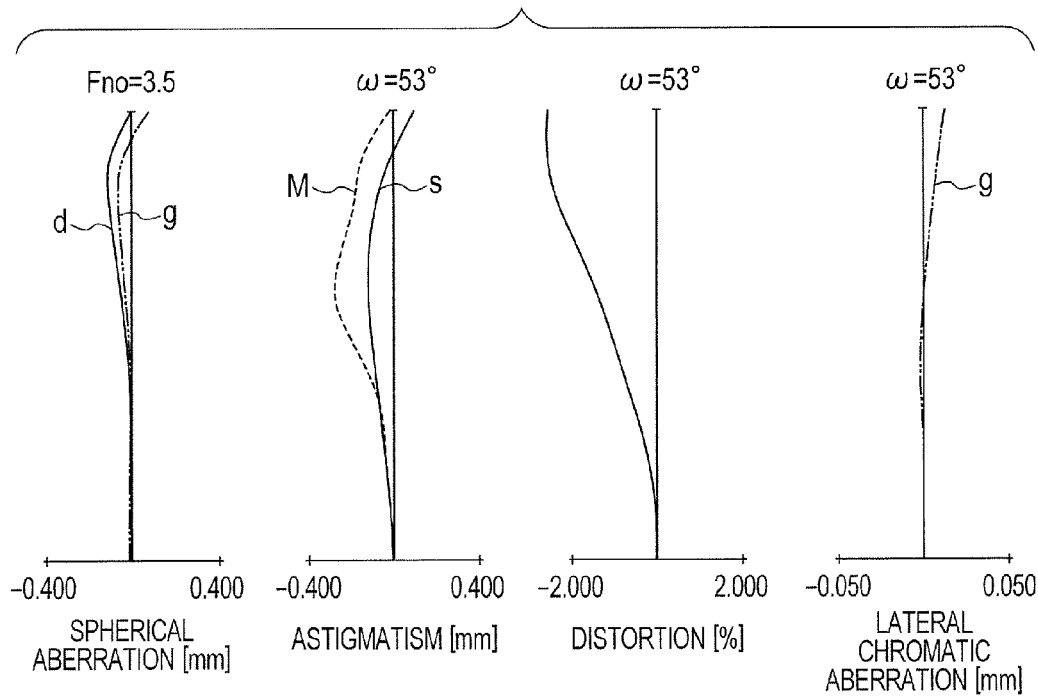
FIG. 18A is an aberration chart at a wide angle end when the object distance of the zoom lens according to the fifth embodiment is at infinity at an environmental temperature of 23° C.
Figure 18B:
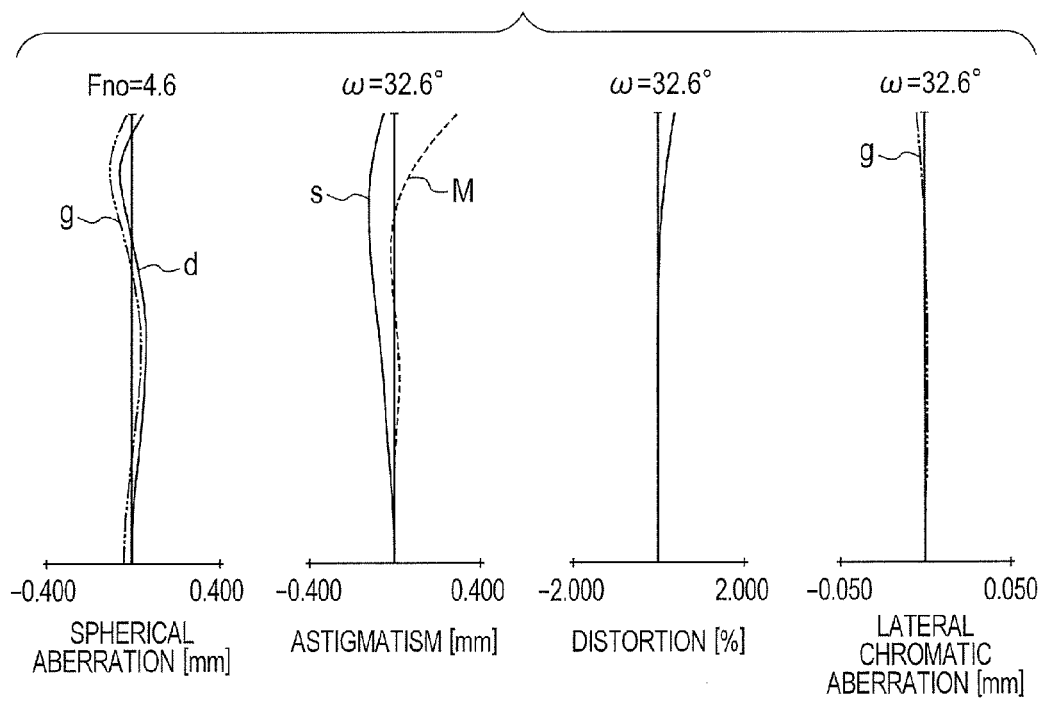
FIG. 18B is an aberration chart at a telephoto end when the object distance of the zoom lens according to the fifth embodiment is at infinity at the environmental temperature of 23° C.
Figure 19A:
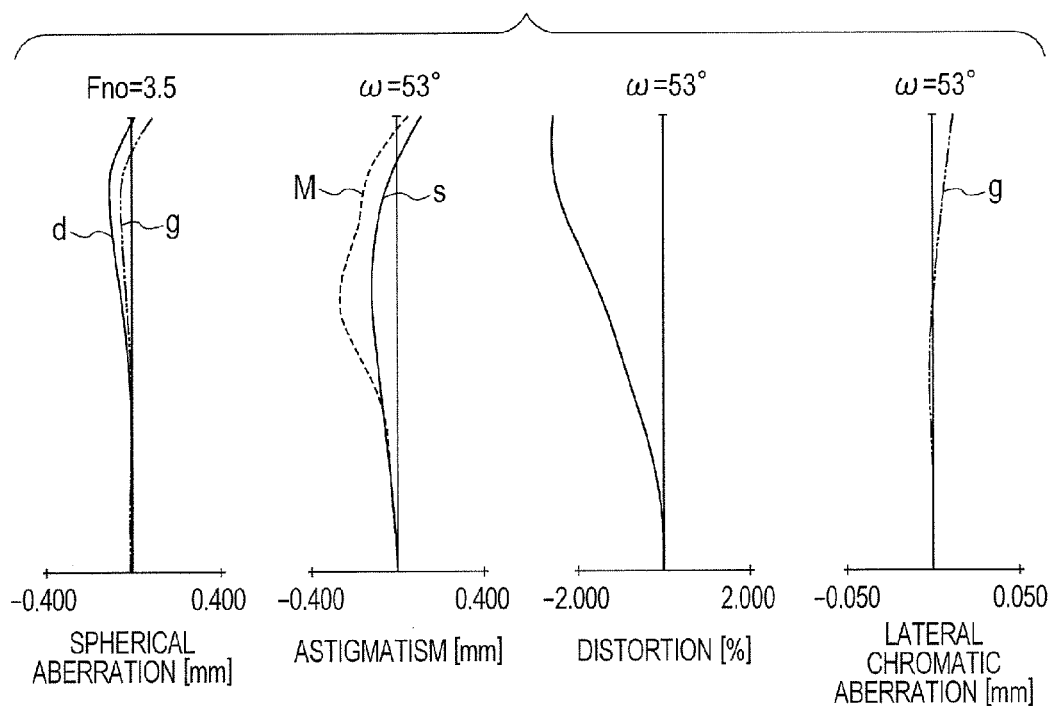
FIG. 19A is an aberration chart at the wide angle end when the object distance of the zoom lens according to the fifth embodiment is at infinity at the environmental temperature of 40° C.
Figure 19B:
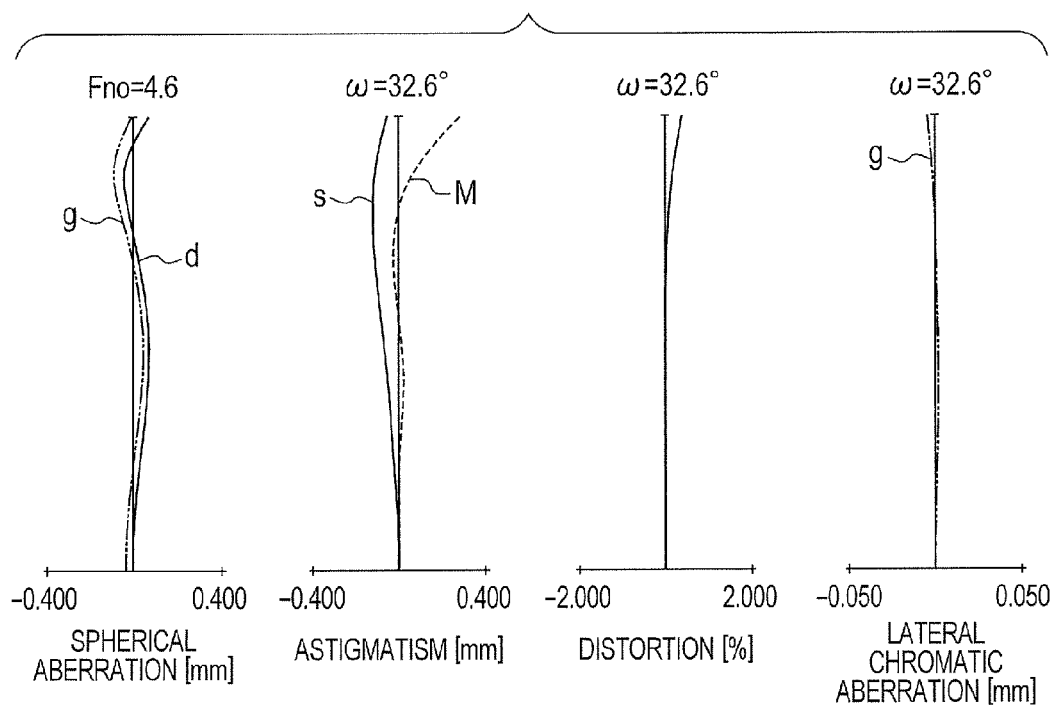
FIG. 19B is an aberration chart at the telephoto end when the object distance of the zoom lens according to the fifth embodiment is at infinity at the environmental temperature of 40° C.
Figure 20A:
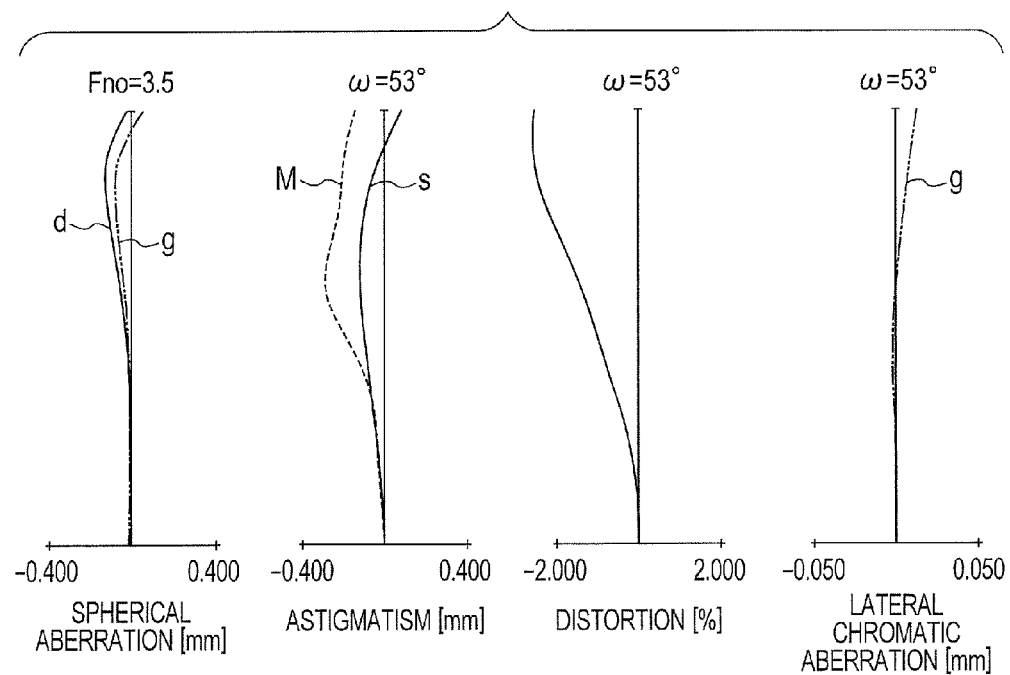
FIG. 20A is an aberration chart at the wide angle end when the object distance of the zoom lens according to the fifth embodiment is at infinity at the environmental temperature of −10° C.
Figure 20B:
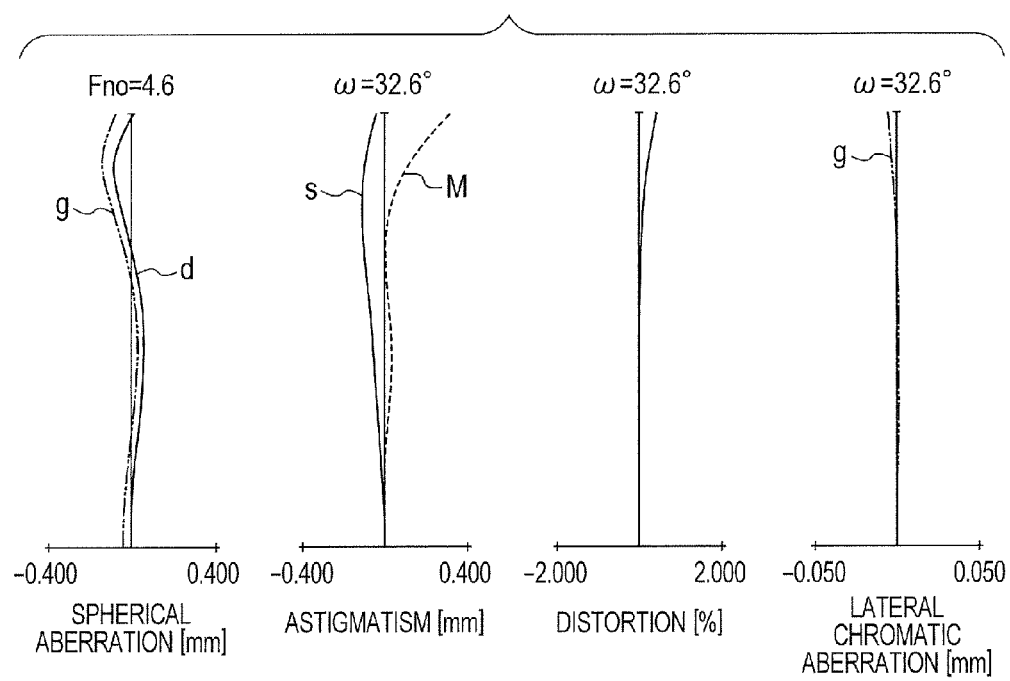
FIG. 20B is an aberration chart at the telephoto end when the object distance of the zoom lens according to the fifth embodiment is at infinity at the environmental temperature of −10° C.

FIG. 17 is a lens sectional view at a wide angle end of a zoom lens according to a fifth embodiment of the present invention. FIG. 18A is an aberration chart at the wide angle end and FIG. 18B is an aberration chart at a telephoto end when an object distance of the zoom lens according to the fifth embodiment is at infinity at an environmental temperature of 23° C. FIG. 19A is an aberration chart at the wide angle end and FIG. 19B is an aberration chart at the telephoto end when the object distance of the zoom lens according to the fifth embodiment is at infinity at the environmental temperature of 40° C. FIG. 20A is an aberration chart at the wide angle end and FIG. 20B is an aberration chart at the telephoto end when the object distance of the zoom lens according to the fifth embodiment is at infinity at the environmental temperature of −10° C.

In each of the aberration diagrams, a d-line and a g-line are indicated by d and g, respectively. A meridional image surface and a sagittal image surface are indicated by M and S, respectively. A distortion is represented by the d-line. A chromatic aberration of magnification is represented by the g-line. F number is indicated by Fno and a half angle of view is indicated by ω.

The zoom lens of each of the embodiments is a photographing lens (photographing optical system) used for an image pickup device such as a video camera or a digital camera or a projection lens (projection optical system) used for an image projection device (projector). On each of the lens sectional views, the left is a light incident side (enlargement conjugate side; object side; front side), whereas the right is a light emitting side (reduction conjugate side; image side; rear side). When the zoom lens is used for the projector, the left is a screen side, whereas the right is a projected image side (image display element side). The lens sectional views illustrate the zoom lens L0.

In each of the lens sectional views, i indicates the order of the lens unit counted from the light incident side, and Li indicates the i-th lens unit. Each of the lens sectional views also illustrates a lens portion LF for focusing, an aperture stop SP, and an image plane IP which corresponds to an original image (projected image) on a solid image pickup element (photo-electric conversion element) or a liquid crystal panel (image display element) which receives light of an image.

The arrow for each of the lens units indicates a direction of movement (moving trajectory) of the lens unit when zooming is performed from the wide angle end to the telephoto end. Here, the wide angle end and the telephoto end are respectively zoom positions when the lens unit for magnification is located at each end of a range in which the lens unit is movable on an optical axis in view of mechanism. The arrow for FO indicates a direction of movement of the lens portion LF for focusing from infinity (a far distance) to a near distance.

FIG. 9 illustrates an optical block GB corresponding to a prism for color separation or color synthesis, an optical filter, a face plate (parallel plane glass), a crystal lowpass filter, or an infrared cut filter. The zoom lens illustrated in FIG. 1 according to the first embodiment, the zoom lens illustrated in FIG. 13 according to the fourth embodiment, and the zoom lens illustrated in FIG. 17 according to the fifth embodiment are image pickup optical systems used for an image pickup device.

FIGS. 1, 13, and 17 illustrate a first lens unit L1 having a negative refractive power (optical power=inverse of a focal length), a second lens unit L2 having a positive refractive power, a third lens unit L3 having a negative refractive power, and a fourth lens unit L4 having a positive refractive power. For zooming from the wide angle end to the telephoto end, each of the lens units moves on the optical axis so as to change a distance between the adjacent lens units as indicated by the arrows. The first lens unit L1 moves on a convex trajectory toward the image side. The second lens unit L2, the third lens unit L3, and the fourth lens unit L4 move toward the object. The aperture stop SP is located in the second lens unit L2, and moves integrally with the second lens unit L2 (on the same trajectory) for zooming.

The zoom lens illustrated in FIG. 5 according to the second embodiment is an image pickup optical system used for an image pickup device. FIG. 5 illustrates the first lens unit L1 having a positive refractive power, the second lens unit L2 having a negative refractive power, the third lens unit L3 having a positive refractive power, the fourth lens unit L4 having a negative refractive power, a fifth lens unit L5 having a positive refractive power, a sixth lens unit L6 having a negative refractive power, and a seventh lens unit L7 having a negative refractive power.

For zooming from the wide angle end to the telephoto end, the first to sixth lens units L1 to L6 move on the optical axis so as to change a distance between the adjacent lens units as indicated by the arrows. The seventh lens unit L7 is immobile for zooming. The aperture stop SP is located on the image side of the third lens unit L3, and moves integrally with the third lens unit L3 for zooming.

The zoom lens illustrated in FIG. 9 according to the third embodiment is a zoom lens for image projection. FIG. 9 illustrates the first lens unit L1 having a negative refractive power, the second lens unit L2 having a positive refractive power, the third lens unit L3 having a positive refractive power, the fourth lens unit L4 having a positive refractive power, and the fifth lens unit L5 having a positive refractive power. For zooming, the first lens unit L1 and the fifth lens unit L5 are immobile, whereas the second lens unit L2, the third lens unit L3, the fourth lens unit L4, and the fifth lens unit L5 move for zooming.

For zooming from the wide angle end to the telephoto end, the second lens unit L2, the third lens unit L3, and the fourth lens unit L4 move toward the object so as to change a distance between the adjacent lens units, as indicated by the arrows. Specifically, the distance between the adjacent lens units changes for zooming. Focusing from a far distance to a near distance is performed by moving the lens portion LF which corresponds to a part of the first lens unit L1 toward the original image IP.

In general, in the zoom lens, it is difficult to successfully correct a chromatic aberration over the entire zoom range only by using a material having a small absolute value $|\Delta\theta gF|$ of an anomalous partial dispersion ratio (definition thereof is described later) as a material. Specifically, it is difficult to simultaneously correct a chromatic aberration between the g-line and the F-line (between wavelengths of the g-line and the F-line) and a chromatic aberration between the F-line and a C-line (between wavelengths of the F-line and the C-line) in a well-balanced manner.

However, if the chromatic aberration between the g-line and the F-line can be successfully corrected by using the material having a large absolute value $|\Delta\theta gF|$ of the anomalous partial dispersion ratio, a correction balance for the chromatic aberration can be changed by using another material in the zoom lens. Therefore, as a result, the chromatic aberration between the F-line and the C-line can also be corrected successfully. Then, the chromatic aberration can be successfully corrected over a wide wavelength band between the g-line and the C-line (between the wavelengths of the g-line and the C-line). As the material having a large absolute value $|\Delta\theta gF|$ of the anomalous partial dispersion ratio, for example, there is fluorite which has a high anomalous partial dispersion characteristic.

Although fluorite has a larger absolute value $|\Delta\theta gF|$ of the anomalous partial dispersion ratio than those of common materials, the absolute value $|\Delta\theta gF|$ of the anomalous partial dispersion ratio of fluorite is not sufficiently large. If the chromatic aberration is intended to be positively corrected by using a low dispersion material having a large Abbe number as in the case of fluorite, a lens formed by using the material as described above is required to have a larger refractive power. As a result, various aberrations other than the chromatic aberration, such as spherical aberration, coma, and astigmatism, frequently occur.

Hitherto, it is known that the use of an organic material having a large absolute value $|\Delta\theta gF|$ of the anomalous partial dispersion ratio is effective as a method of effectively correcting the chromatic aberration. However, in general, the organic material such as a resin or a plastic has a larger change in refractive index with respect to a temperature change as compared with glass. For example, when a ratio of a change do in refractive index at the d-line at 23° C. to a temperature change dT is dn/dT, a value thereof is about 10 to 200 times as large as that of glass. Therefore, when the optical element made of the organic material having a large refractive power is used, it is important to reduce a fluctuation in focusing of the optical system and a variation in aberration with respect to the temperature change.

In order to reduce the fluctuation in the optical performance with respect to the temperature change, there is a method of appropriately combining organic materials under predetermined conditions. It is necessary to increase the refractive power of the lens made of the organic material having a large absolute value $|\Delta\theta gF|$ of the anomalous partial dispersion ratio to enhance performance and reduce the entire system size while sufficiently compensating for the temperature. In addition, the temperature is required to be compensated for with higher accuracy.

Therefore, in the zoom lens of the present invention, lenses made of multiple organic materials are used in the same lens unit. In this manner, a change in refractive power in the lens unit with respect to the temperature change is suppressed.

The organic materials used in the present invention are not all required to be materials having a large absolute value $|\Delta\theta gF|$ of the anomalous partial dispersion ratio. Only at least one of the materials needs to have a large absolute value $|\Delta\theta gF|$ of the anomalous partial dispersion ratio. In this case, the optical element made of a material having a large absolute value $|\Delta\theta gF|$ of the anomalous partial dispersion ratio assumes a role of correcting the chromatic aberration, whereas the optical element made of another optical material assumes a role of compensating for a change in optical characteristics of the material having a large absolute value $|\Delta\theta gF|$ of the anomalous partial dispersion ratio, which is caused with the temperature change.

In general, when the optical element $A_\theta$ made of an organic material is used in the optical system so as to correct the chromatic aberration, a refractive index of the material or a lens shape changes with respect to the environmental change such as the temperature change. In such a case, an aberration occurring on each lens surface of the optical element $A_\theta$ varies. Moreover, as a result of a change in refractive power of the optical element $A_\theta$, a height from the optical axis, at which an on-axis paraxial ray or a pupil paraxial ray passes through the lens surface, and an incident angle on the lens surface change. Thus, the aberration occurring on other lens(es) also varies.

In the present invention, multiple materials, each having characteristics greatly varying with respect to the environmental change as in the case of the organic materials, are combined to suppress the variation in aberration due to the temperature change. For example, by providing the multiple organic materials closer to each other in the optical axis direction, the sum of changes in refractive power is reduced. In this manner, a change of a ray path with respect to the temperature change can be reduced to reduce the amount of variation in aberration. In the zoom lens, the above-mentioned condition is required to be satisfied over the entire zoom range. If the multiple organic materials are respectively provided to different lens units, however, it becomes difficult to satisfy the above-mentioned condition. Thus, the multiple organic materials are required to be provided in the same lens unit.

In the zoom lens of the present invention, one lens unit L of the lens units constructing the zoom lens includes the multiple optical elements A made of materials which satisfy Conditional Expression (1). Moreover, the multiple optical elements A include at least one optical element $A_\theta$ made of a material which satisfies Conditional Expression (2). In this case, when a refractive index of the material forming the optical element $A_\theta$ at the d-line is $nd_{A\theta}$, a refractive index at the g-line is $ng_{A\theta}$, a refractive index at the C-line is $nC_{A\theta}$, and a refractive index at the F-line is $nF_{A\theta}$, an Abbe number $vd_{A\theta}$, a partial dispersion ratio $\theta gF_{A\theta}$, and an anomalous partial dispersion ratio $\Delta\theta gF_{A\theta}$ of the material are defined by the following expressions.

$$vd_{A\theta} = (nd_{A\theta} - 1)/(nF_{A\theta} - nC_{A\theta})$$

$$\theta gF_{A\theta} = (ng_{A\theta} - nF_{A\theta})/(nF_{A\theta} - nC_{A\theta})$$

$$\Delta\theta gF_{A\theta} = \theta gF_{A\theta} - (-1.665 \times 10^{-7} \times vd_{A\theta}^3 + 5.213 \times 10^{-5} \times vd_{A\theta}^2 - 5.656 \times 10^{-3} \times vd_{A\theta} + 7.278 \times 10^{-1})$$

where i indicates the order of the optical element $A_\theta$ in the lens unit L counted from the light incident side. The i-th optical element $A_\theta$ in the lens unit L counted from the light incident side is denoted as the i-th optical element. When a focal length of the i-th optical element is fi, a conditional expression $$|1/(\Sigma(1/fi) \times fL)| < 2.2 \qquad (3)$$

is satisfied. In this expression, $$\Sigma(1/fi) = \sum_i 1/fi$$
$$= \frac{1}{f1} + \frac{1}{f2} + \ldots$$

holds. Here, j indicates the order of the optical element A in the lens unit L counted from the light incident side, and the j-th optical element A in the lens unit L counted from the light incident side is denoted as the j-th optical element. An average value of changes in refractive power φpj of a positive lens of the j-th optical element with respect to a temperature change within the temperature range of from 0° C. to 40° C. is Δφpj and an average value of changes in refractive power φnj of a negative lens of the j-th optical element with respect to a temperature change within the temperature range of from 0° C. to 40° C. is Δφnj.

In this case, a condition expressed by:

$$-1.5 < \Sigma(\Delta\phi pj)/\Sigma(\Delta\phi nj) < -0.66 \qquad (4)$$

is satisfied.

Next, technical meaning of each of the above-mentioned conditional expressions is described. Conditional Expression (1) defines the ratio dn/dt of the change do in refractive index of the material of the optical element A with respect to a temperature change dt. As specific examples of the material (optical material) satisfying Conditional Expression (1), there are organic materials which are generally frequently used as materials such as acrylic, PC, a fluorene resin, and polystyrene. The material to be used is not limited to those described above as long as Conditional Expression (1) is satisfied. For a material generally used as the optical material, the average value |ΔNav| is about $20.0 \times 10^{-5}$ at a maximum.

Figure 21A:
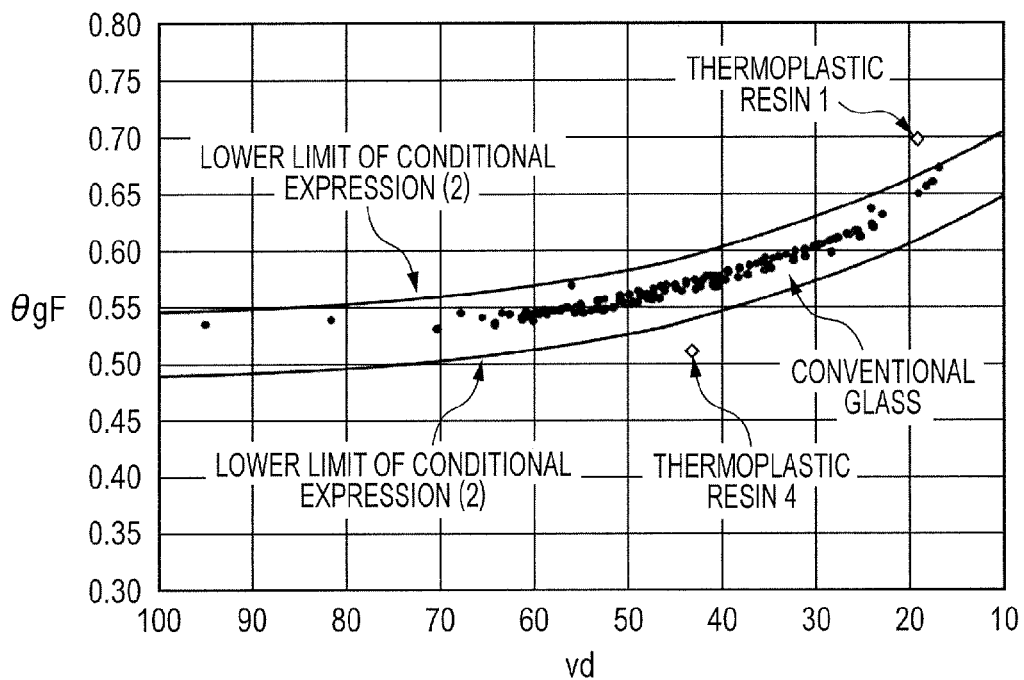
FIG. 21A is an explanatory graph of an Abbe number and a partial dispersion ratio of materials according to the present invention.

It is known that the materials which satisfy Conditional Expression (1) include a large number of materials (optical materials) which also satisfy Conditional Expression (2). Conditional Expression (2) expresses the anomalous partial dispersion characteristic of the optical element $A_\theta$. By using the optical element $A_\theta$ made of the material which satisfies Conditional Expressions (1) and (2) in the zoom lens, it becomes easy to successfully correct the chromatic aberrations of the entire system. If the absolute value of the anomalous partial dispersion ratio $\Delta\theta gF_{A\theta}$ becomes equal to or smaller than the value (0.0272) in Conditional Expression (2), it becomes difficult to successfully correct the chromatic aberration. The range expressed by Conditional Expression (2) is shown in FIG. 21A.

As specific examples of the material (optical material) which satisfies Conditional Expression (2), there are organic materials such as an acrylic UV-curable resin (nd=1.635, vd=22.7, θgF=0.69) and N-polyvinyl carbazole (nd=1.696, vd=17.7, θgF=0.69). The material to be used is not limited to those described above as long as Conditional Expression (2) is satisfied.

As a material (optical material) having characteristics different from those of general glass materials, there is a mixture obtained by dispersing inorganic oxide nanoparticles described below in a synthetic resin. Specifically, there are $TiO_2$ (nd=2.758, vd=9.54, θgF=0.76), ITO (nd=1.857, vd=5.69, θgF=0.29), and the like. When particles of $TiO_2$ (nd=2.758, vd=9.54, θgF=0.76) or ITO (nd=1.857, vd=5.69, θgF=0.29) are dispersed in a synthetic resin at an appropriate volume ratio, a material which satisfies Conditional Expression (2) is obtained.

$TiO_2$ is a material which is used for a variety of applications, and is used as a material for vapor deposition for forming an optical thin film such as an anti-reflective film in the field of optics. Besides, $TiO_2$ is also used as a photocatalyst and a white pigment. Moreover, $TiO_2$ particles are used as a cosmetic material. ITO is known as a material for forming a transparent electrode, and is generally used for a liquid crystal display element, an electroluminescent (EL) element, or the like. Moreover, as other applications, ITO is also used for an infrared-ray shielding element or an ultraviolet-ray shielding element.

A mean diameter of the particles to be dispersed in the resin in each of the embodiments is preferably about 2 nm to 50 nm in view of the effects of scattering or the like. A dispersant may be added so as to prevent condensation. As a medium material in which the particles are to be dispersed is preferably a polymer. With the polymer, high mass productivity can be obtained by photopolymerization molding or heat polymerization molding using a molding die or the like. A dispersion characteristic N(λ) of the mixture in which nanoparticles are dispersed can be easily calculated by the following expression derived from the well-known Drude's formula.

Specifically, the refractive index N(λ) at a wavelength λ is:

$$N(\lambda) = [1 + V\{Npar(\lambda)^2 - 1\} + (1-V)\{Npoly(\lambda)^2 - 1\}]^{1/2}$$

In this expression, λ is an arbitrary wavelength, Npar is a refractive index of particles, Npoly is a refractive index of a polymer, and V is a fraction of a total volume of the particles to a polymer volume. The material to be used is not limited to those described above as long as Conditional Expression (2) is satisfied. In consideration of the use of the material as an optical material, $|\Delta\theta gFA_\theta|$ is generally about 0.1 at a maximum.

Conditional Expression (3) relates to the refractive power of the optical element $A_\theta$. When the value of the left side $|1/(\Sigma(1/\text{fi})\times fL)|$ of Conditional Expression (3) becomes equal to or larger than the value (2.2) in Conditional Expression (3), the chromatic aberration is insufficiently corrected. Thus, the above-mentioned case is not preferred. In particular, as the size of the entire system of the zoom lens is intended to be further reduced, it becomes more difficult to successfully correct the chromatic aberration unless the refractive power of the i-th optical element is increased. In order to successfully correct the chromatic aberration, it is preferred to satisfy Conditional Expression (3).

Further, in order to reduce the change in optical performance with respect to the temperature change over the entire zoom range, it is preferred to compensate for the temperature change in the same lens unit, as described above. Here, "the same lens unit" means a lens unit in which all the lenses move integrally for zooming. Conditional Expression (3) is more preferably set as follows.

$$|1/(\Sigma(1/fi)\times fL)|<1.8 \qquad (3a)$$

Conditional Expression (3a) is further preferably set as follows.

$$|1/(\Sigma(1/fi)\times fL)|<1.4 \qquad (3b)$$

Conditional Expression (4) relates to the refractive power of the j-th optical element in the lens unit L. When only a material having a small change in refractive index with respect to the temperature change is used as in the case of general materials, the optical performance of each of the lenses has a small change with respect to the environmental change such as the temperature change or the humidity change. Therefore, the variation in aberration is sufficiently small.

In order to successfully correct the color aberration, however, it is preferred to use an organic material having a large absolute value $|\Delta\theta gF|$ of the anomalous partial dispersion ratio. In such a case, multiple organic materials need to be provided so as to be located closer to each other along the optical axis direction to reduce the sum of changes in refractive power, as described above. In this manner, a change of the ray path with respect to the temperature change can be reduced. As a result, the amount of variation in aberration can be suppressed for the entire system. It is necessary for the zoom lens to reduce the change of the ray path in the entire zoom range. Therefore, it is preferred to arrange the multiple organic materials in the same lens unit. In this case, the amount of variation in aberration for the entire system can be successfully suppressed by satisfying Conditional Expression (4).

When the value of $\Sigma(\Delta\phi pj)/\Sigma(\Delta\phi nj)$ becomes equal to or larger than the upper limit value (−0.66) of the range expressed by Conditional Expression (4), the change in refractive power of the negative lens of the j-th optical element becomes too large. On the other hand, when the value of $\Sigma(\Delta\phi pj)/\Sigma(\Delta\phi nj)$ becomes equal to or smaller than the lower limit value (−1.5) of the range expressed by Conditional Expression (4), the change in refractive power of the positive lens of the j-th optical element becomes too large. As a result, it becomes difficult to successfully correct the variation in aberration with respect to the temperature change. Thus, both the above-mentioned cases are not preferred. Conditional Expression (4) is an expression for making the changes in refractive power closer for the positive lens and the negative lens. Conditional Expression (4) is more preferably set as follows.

$$-1.47<\Sigma(\Delta\phi pj)/\Sigma(\Delta\phi nj)<-0.68 \qquad (4a)$$

As described above, according to the present invention, the zoom lens which is capable of successfully correcting the chromatic aberration and also successfully correcting the variation in optical performance with respect to the temperature change in the range of from −10° C. to 40° C. as shown in each of the aberration charts can be obtained.

The zoom lens of the present invention is further preferred to satisfy at least one of conditional expressions described below. As a result, the zoom lens with a further reduced change in optical performance with respect to the environmental change, in particular, the temperature change while maintaining high optical performance can be obtained. Specifically, the j-th optical element in the lens unit L counted from the light incident side is the j-th optical element, an equivalent Abbe number of the material of the positive lens of the j-th optical element is $vp$, and an equivalent Abbe number of the material of the negative lens of the j-th optical element is $vn$.

Then, the conditional expression:

$$|vp-|n||<38 \qquad (5)$$

is to be satisfied. The refractive index of the material at the d-line is indicated by $nd$, and the Abbe number of the material is indicated by $vd$. Then, at least one optical element of the optical elements A and the at least one optical element of the optical elements $A_\theta$ both satisfy Conditional Expressions (6):

$$nd<6.667\times 10^{-4}vd^2-5.000\times 10^{-2}vd+2.533 \text{ (when } vd\leq 35)$$

$$nd<1.6 \text{ (when } vd>35) \qquad (6)$$

Here, $$\frac{\Sigma(\delta\phi pj)}{\Sigma(\delta\phi nj)} = \frac{\sum_j(\delta\phi pj)}{\sum_j(\delta\phi nj)}$$

$$= \frac{(\delta\phi p1 + \delta\phi p2 + \ldots)}{(\delta\phi n1 + \delta\phi n2 + \ldots)}$$

$$vp = \phi p \Big/ \left(\sum_j \frac{\phi pj}{vpj}\right)$$

$$= \phi p \Big/ \left(\frac{\phi p1}{vp1} + \frac{\phi p2}{vp2} + \ldots\right)$$

$$vn = \phi n \Big/ \left(\sum_j \frac{\phi nj}{vnj}\right)$$

$$= \phi p \Big/ \left(\frac{\phi n1}{vn1} + \frac{\phi n2}{vn2} + \ldots\right)$$

hold. Next, technical meaning of Conditional Expressions (5) and (6) is described. Conditional Expression (5) relates to the Abbe number of the material of the j-th optical element in the lens unit L. When the absolute value of the difference of the equivalent Abbe number of the negative lens from the equivalent Abbe number of the positive lens becomes equal to or larger than the upper limit value (38) expressed by Conditional Expression (5), a difference between a change in chromatic aberration of the positive lens of the j-th optical element and a change in chromatic aberration of the negative lens of the j-the optical element becomes larger. As a result, the chromatic aberration sometimes remains. Thus, the above-mentioned case is not preferred. Conditional Expression (5) is more preferably set as follows.

$$|vp-vn|<20 \quad (5a)$$

Conditional Expression (5a) is further preferably set as follows.

$$|vp-vn|<16 \quad (5b)$$

Figure 21B:
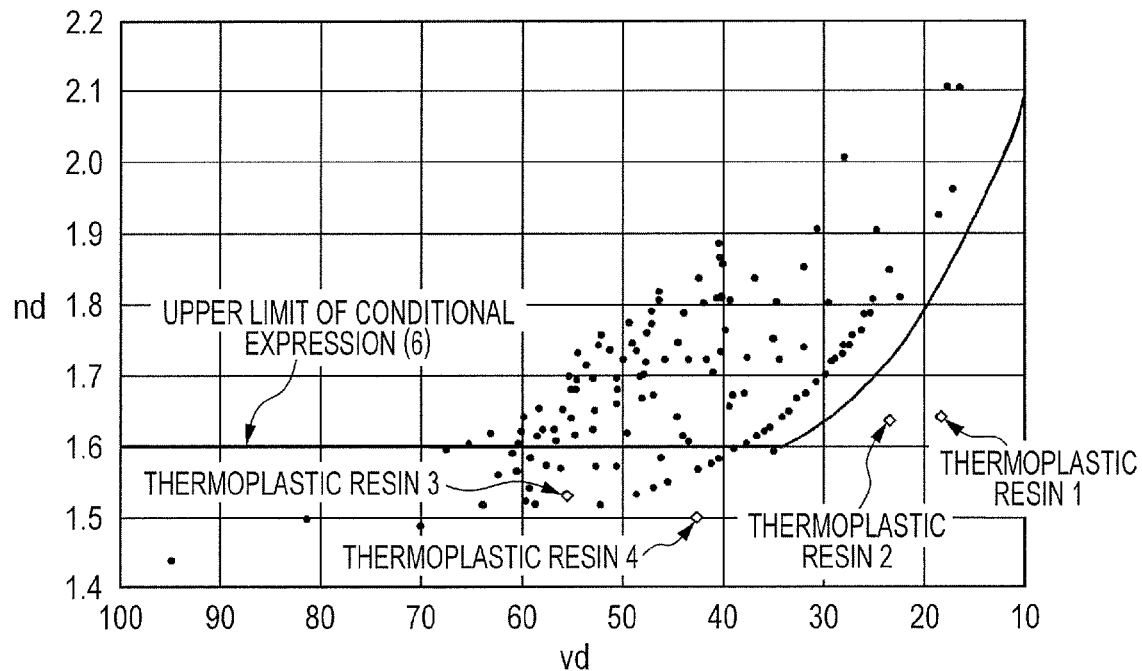
FIG. 21B is an explanatory graph of the Abbe number and a refractive index of the materials according to the present invention.

Conditional Expressions (6) relate to the refractive index and the Abbe number of the material of the at least one of the optical elements A and the material of the at least one of optical elements $A_\theta$. As the material which is located out of the range expressed by Conditional Expressions (6) although Conditional Expressions (1) and (2) are satisfied, there is a mixture obtained by dispersing inorganic oxide nanoparticles into a synthetic resin. In this case, the amount of mixed inorganic oxide nanoparticles is too large. Therefore, the above-mentioned mixture is not preferred as the optical element because of a low transmittance or the like. The range expressed by Conditional Expressions (6) is shown in FIG. 21B.

As described above, according to the present invention, the zoom lens capable of successfully correcting the variation in optical performance with respect to the temperature change in the range from −10° C. to 40° C. as shown in each of the aberration charts while successfully correcting the chromatic aberration can be obtained.

The zoom lens of the present invention includes the aperture stop. In the zoom lens, the first lens unit among the multiple lens units counted from the light incident side to the light emitting side has the negative refractive power. The optical element $A_\theta$ is located on the light incident side of the aperture stop. Alternatively, the zoom lens of the present invention includes the aperture stop. In the zoom lens, the first lens unit among the multiple lens units counted from the light incident side to the light emitting side has the negative refractive power. The optical element $A_\theta$ is located on the light emitting side of the aperture stop. Further alternatively, the zoom lens of the present invention includes the aperture stop. In the zoom lens, the first lens unit among the multiple lens units counted from the light incident side to the light emitting side has the positive refractive power. The optical element $A_\theta$ is located on the light incident side of the aperture stop.

Next, a lens configuration according to each of the embodiments is described.

First Embodiment

A lens configuration of the zoom lens L0 according to the first embodiment, which is illustrated in FIG. 1, is described. The zoom lens L0 according to the first embodiment includes the first lens unit L1 having the negative refractive power, the second lens unit L2 having the positive refractive power, which includes the aperture stop SP, the third lens unit L3 having the negative refractive power, and the fourth lens unit L4 having the positive refractive power in the stated order from the light incident side to the light emitting side. The lens units move so as to change the distance between the adjacent lens units for zooming.

The first lens unit L1 includes four lenses. The two lenses on the light emitting side construct the focusing portion LF which moves for focusing. The focusing portion LF moves to the light incident side in the optical axis direction as indicated by the arrow FO for focusing from infinity to a near distance. The lens unit L is the fourth lens unit L4 in this embodiment.

The third optical element $A_\theta$ in the fourth lens unit L4 counted from the light incident side is made of a thermoplastic resin 1 having optical characteristics shown in Table 1, and has the anomalous partial dispersion characteristic. By using the optical element $A_\theta$ located at a position on the light emitting side of the aperture stop SP, at which an incident height of an off-axis principal ray is high, a lateral chromatic aberration is successfully corrected over the entire zoom range.

The fifth optical element A in the fourth lens unit L4 counted from the light incident side is made of a thermoplastic resin 2 having optical characteristics shown in Table 1. In this manner, variations in various aberrations in the optical element $A_\theta$ with respect to the temperature change are successfully compensated for.

Second Embodiment

A lens configuration of the zoom lens L0 according to the second embodiment, which is illustrated in FIG. 5, is described. The zoom lens L0 according to the second embodiment includes the first lens unit L1 having the positive refractive power, the second lens unit L2 having the negative refractive power, the third lens unit L3 having the positive refractive power, and the aperture stop SP in the stated order from the light incident side to the light emitting side. On the light emitting side of the aperture stop SP, the zoom lens L0 further includes the fourth lens unit L4 having the negative refractive power, the fifth lens unit L5 having the positive refractive power, the sixth lens unit L6 having the negative refractive power, and the seventh lens unit L7 having the negative refractive power.

The sixth lens unit L6 constructs the lens portion LF for focusing in this embodiment. For focusing from infinity to a near distance, the lens portion LF moves in the optical axis direction to the light emitting side as indicated by the arrow FO. The lens unit L is the third lens unit in this embodiment. The fourth optical element $A_\theta$ in the third lens unit L3 counted from the light incident side is made of a thermoplastic resin 1, and has the anomalous partial dispersion characteristic. By using the optical element $A_\theta$ located at a position on the light incident side of the aperture stop SP, at which an incident height of an on-axis paraxial ray is high, an axial chromatic aberration is successfully corrected over the entire zoom range, in particular, at the wide angle side.

The third optical element A in the third lens unit L3 counted from the light incident side is made of a thermoplastic resin 2. In this manner, variations in various aberrations in the optical element $A_\theta$ with respect to the temperature change are successfully compensated for.

Third Embodiment

A lens configuration of the zoom lens L0 according to the third embodiment, which is illustrated in FIG. 9, is described. The zoom lens L0 according to the third embodiment includes the first lens unit L1 having the negative refractive power, the second lens unit L2 having the positive refractive power, the third lens unit L3 having the positive refractive power, the fourth lens unit L4 having the positive refractive power, which includes the aperture stop SP, and the fifth lens unit L5 having the positive refractive power in the stated order from the light incident side to the light emitting side. The first lens unit L1 includes five lenses. The two lenses on the light emitting side construct the lens portion LF for focusing in this embodiment. For focusing from a far distance to a near distance, the lens portion LF moves in the optical axis direction to the light emitting side as indicated by the arrow FO.

The lens unit L is the first lens unit L1 in this embodiment. The third optical element $A_\theta$ in the first lens unit L1 counted from the light incident side is made of the thermoplastic resin 1, and has the anomalous partial dispersion characteristic. By using the optical element $A_\theta$ located on the light incident side of the aperture stop SP, in particular, at a position at which an incident height of an off-axis principal ray is high, the lateral chromatic aberration is successfully corrected over the entire zoom range. The fourth optical element A in the first lens unit L1 counted from the light incident side is made of the thermoplastic resin 2. In this manner, variations in various aberrations in the optical element $A_\theta$ with respect to the temperature change are successfully compensated for.

Fourth Embodiment

A lens configuration of the zoom lens L0 according to the fourth embodiment, which is illustrated in FIG. 13, is described. The lens configuration of the zoom lens of the fourth embodiment relating to zooming type and focusing is the same as that of the first embodiment. The lens unit L is the fourth lens unit L4 in this embodiment. The third optical element $A_\theta$ in the fourth lens unit L4 counted from the light incident side is made of the thermoplastic resin 1, and has the anomalous partial dispersion characteristic. By using the optical element $A_\theta$ located at a position on the light emitting side of the aperture stop SP, at which an incident height of an off-axis principal ray is high, the lateral chromatic aberration is successfully corrected over the entire zoom range.

The fifth optical element A in the fourth lens unit L4 counted from the light incident side is made of a thermoplastic resin 3 having optical characteristics shown in Table 1. In this manner, variations in various aberrations in the optical element $A_\theta$ with respect to the temperature change are successfully compensated for.

Fifth Embodiment

A lens configuration of the zoom lens L0 according to the fifth embodiment, which is illustrated in FIG. 17, is described. The lens configuration of the zoom lens of the fifth embodiment relating to zooming type and focusing is the same as that of the first embodiment. The lens unit L is the fourth lens unit L4 in this embodiment. The fifth optical element $A_\theta$ in the fourth lens unit L4 counted from the light incident side is made of the thermoplastic resin 4 having optical characteristics shown in Table 1, and has the anomalous partial dispersion characteristic. By using the optical element $A_\theta$ located at a position on the light emitting side of the aperture stop SP, at which an incident height of an off-axis principal ray is high, the lateral chromatic aberration is successfully corrected over the entire zoom range.

The third optical element A in the fourth lens unit L4 counted from the light incident side is made of a thermoplastic resin 2 having optical characteristics shown in Table 1. In this manner, variations in various aberrations in the optical element $A_\theta$ with respect to the temperature change are successfully compensated for. In each of the embodiments described above, the zoom lens is described. By using only a focal distance at a specific zoom position, however, the zoom lens can also be treated as a single focal length lens system.

Hereinafter, Numerical Examples 1 to 5 respectively corresponding to the first to fifth embodiments of the present invention are described. In each of Numerical Examples, i indicates the order of a surface counted from the light incident side, ri is a curvature radius (mm) of the i-th surface counted from the light incident side, di is a distance (mm) on the axis between the i-th surface and the i+1-th surface counted from the light incident side, ndi is a refractive index of a material of the i-th optical element, and vdi is an Abbe number of the material of the i-th optical element.

Values of the focal length f, the F number Fno, the half angle of view (degree) are those obtained when focus is on an object at infinity. Moreover, BF is a backfocus, and a total lens length is an equivalent air distance from a first lens surface to a paraxial image plane. An aspherical surface is denoted by the symbol * following the surface number. When X is a displacement amount from a surface apex in the optical axis direction, h is a height from the optical axis in a direction perpendicular to the optical axis, R is a paraxial curvature radius, k is a conic constant, and A4, A6, A8, A10, and A12 are respectively aspherical coefficients, an aspherical shape is expressed by the expression:

$$X = \frac{\left(\frac{h^2}{R}\right)}{1+\sqrt{1-(1+k)\left(\frac{h}{R}\right)^2}} + A4 \cdot h^4 + A6 \cdot h^6 + A8 \cdot h^8 + A10 \cdot h^{10} + A12 \cdot h^{12}$$

Moreover, for example, the notation "e±Z" means "$10^{\pm z}$". The relationship between the conditional expressions described above and various numerical values in Numerical Examples is shown in Table 2.

Numerical Example 1

Unit mm

Surface data

| Surface number | r | d | nd | vd | Effective diameter |
|---|---|---|---|---|---|
| 1* | −319.141 | 3.50 | 1.58313 | 59.4 | 50.20 |
| 2 | 18.857 | 1.93 | | | 32.56 |
| 3* | 140.907 | 2.38 | 1.64040 | 18.9 | 32.45 |
| 4* | 63.695 | 11.43 | | | 28.12 |
| 5 | −69.557 | 1.50 | 1.77250 | 49.6 | 24.14 |
| 6 | 20.374 | 0.81 | | | 21.58 |
| 7 | 21.384 | 4.30 | 1.84666 | 23.8 | 21.66 |
| 8 | 91.356 | (Variable) | | | 20.78 |
| 9 | 508.092 | 1.30 | 1.90366 | 31.3 | 9.38 |
| 10 | 11.430 | 4.15 | 1.65412 | 39.7 | 9.60 |
| 11 | −56.784 | 2.21 | | | 10.40 |
| 12 (Stop) | ∞ | 1.29 | | | 11.44 |
| 13 | 27.028 | 2.94 | 1.51742 | 52.4 | 12.28 |
| 14 | −23.130 | (Variable) | | | 12.43 |
| 15 | −27.846 | 0.80 | 1.77250 | 49.6 | 11.60 |
| 16 | 31.888 | 0.15 | | | 11.83 |
| 17 | 23.752 | 2.20 | 1.84666 | 23.8 | 12.02 |
| 18 | 119.997 | (Variable) | | | 12.06 |
| 19 | 25.216 | 3.66 | 1.48749 | 70.2 | 12.36 |
| 20 | −25.230 | 1.00 | 1.90366 | 31.3 | 12.85 |
| 21 | 31.730 | 0.79 | | | 13.62 |
| 22* | 48.864 | 2.39 | 1.64040 | 18.9 | 14.30 Aθ |
| 23* | −29.849 | 0.10 | | | 14.83 |
| 24 | 82.307 | 4.63 | 1.48749 | 70.2 | 15.58 |
| 25 | −15.840 | 0.15 | | | 16.21 |
| 26 | −43.656 | 1.00 | 1.63550 | 23.9 | 16.04 A |
| 27 | 19.695 | 0.21 | | | 16.32 |
| 28 | 17.359 | 5.71 | 1.48749 | 70.2 | 16.85 |
| 29* | −649.985 | (Variable) | | | 17.25 |
| Image plane | ∞ | | | | |

Aspherical surface data

First surface

K = 0.00000e+000　　A4 = 2.92019e−005　　A6 = −5.87235e−008
A8 = 8.77111e−011　　A10 = −6.94517e−014　　A12 = 2.55497e−017

17
-continued

Unit mm

Third surface

K = 0.00000e+000  A4 = 1.49178e−004   A6 = −2.10295e−007
A8 = −1.15204e−010 A10 = 6.01634e−013  A12 = −4.65199e−016

Fourth surface

K = 0.00000e+000  A4 = 1.65356e−004   A6 = 1.63395e−007
A8 = −1.52309e−009 A10 = −3.16468e−012 A12 = 2.22892e−014

Twenty-second surface

K = 0.00000e+000  A4 = 1.35298e−005   A6 = −6.61060e−009
A8 = −3.12384e−009 A10 = −6.54127e−011 A12 = 7.25207e−013

Twenty-third surface

K = 0.00000e+000  A4 = 3.64403e−005   A6 = 2.26761e−007
A8 = −2.61424e−009 A10 = −5.36396e−011 A12 = 3.99885e−013

Twenty-ninth surface

K = 0.00000e+000  A4 = 4.66521e−005   A6 = −9.69970e−008
A8 = 5.51644e−009 A10 = −5.89444e−011 A12 = 2.23821e−013

Various data
Zoom ratio 2.07

| | | | | | |
|---|---|---|---|---|---|
| Focal length | 10.30 | 15.27 | 21.34 | 12.67 | 14.20 |
| F number | 3.50 | 3.99 | 4.60 | 3.73 | 3.88 |
| Angle of field (degree) | 52.98 | 41.81 | 32.62 | 47.16 | 43.89 |
| Image height | 13.66 | 13.66 | 13.66 | 13.66 | 13.66 |
| Total lens length | 123.11 | 119.36 | 121.97 | 120.21 | 119.49 |
| BF | 35.00 | 41.57 | 51.36 | 37.88 | 40.00 |
| d8 | 20.36 | 8.83 | 2.00 | 13.79 | 10.65 |
| d14 | 1.00 | 4.57 | 6.45 | 3.00 | 3.99 |
| d18 | 6.23 | 3.87 | 1.64 | 5.03 | 4.33 |
| d29 | 35.00 | 41.57 | 51.36 | 37.88 | 40.00 |
| Incident pupil position | 17.24 | 16.04 | 14.95 | 16.63 | 16.27 |
| Exit pupil position | −46.86 | −48.48 | −44.28 | −48.55 | −48.70 |
| Front principal point position | 26.24 | 28.72 | 31.53 | 27.44 | 28.20 |
| Rear principal point position | 17.24 | 16.04 | 14.95 | 16.63 | 16.27 |

Zoom lens unit data

| Unit | First surface | Focal length | Lens structure length | Front principal point position | Rear principal point position |
|---|---|---|---|---|---|
| 1 | 1 | −14.97 | 25.85 | 6.53 | −12.20 |
| 2 | 9 | 27.62 | 11.88 | 9.25 | 1.44 |
| 3 | 15 | −43.04 | 3.15 | 0.09 | −1.69 |
| 4 | 19 | 35.43 | 19.64 | 6.67 | −7.06 |

Single lens data

| Lens | First surface | Focal length |
|---|---|---|
| 1 | 1 | −30.42 |
| 2 | 3 | −183.72 |
| 3 | 5 | −20.25 |
| 4 | 7 | 32.07 |
| 5 | 9 | −12.96 |
| 6 | 10 | 14.90 |
| 7 | 13 | 24.58 |
| 8 | 15 | −19.13 |
| 9 | 17 | 34.62 |
| 10 | 19 | 26.50 |
| 11 | 20 | −15.42 |
| 12 | 22 | 29.28 |
| 13 | 24 | 27.68 |
| 14 | 26 | −21.23 |
| 15 | 28 | 34.78 |

18
Numerical Example 2

Unit mm

Surface data

| Surface number | r | d | nd | vd | Effective diameter |
|---|---|---|---|---|---|
| 1 | 133.194 | 2.80 | 1.85026 | 32.3 | 66.75 |
| 2 | 93.393 | 0.10 | | | 65.68 |
| 3 | 90.658 | 8.63 | 1.43387 | 95.1 | 65.74 |
| 4 | −1158.415 | 0.20 | | | 65.55 |
| 5 | 107.850 | 6.26 | 1.49700 | 81.5 | 64.62 |
| 6 | 757.630 | (Variable) | | | 63.99 |
| 7 | ∞ | 2.00 | | | 28.21 |
| 8 | −461.169 | 1.40 | 1.88300 | 40.8 | 27.43 |
| 9 | 58.361 | 3.72 | | | 26.80 |
| 10 | −46.939 | 1.40 | 1.49700 | 81.5 | 26.81 |
| 11 | 76.130 | 0.21 | | | 27.84 |
| 12 | 76.584 | 3.52 | 1.85478 | 24.8 | 27.96 |
| 13 | −474.498 | (Variable) | | | 28.17 |
| 14 | 78.859 | 5.68 | 1.65844 | 50.9 | 28.68 |
| 15 | −44.760 | 1.50 | 1.84666 | 23.8 | 28.56 |
| 16 | −74.397 | 2.96 | | | 28.60 |
| 17 | −56.144 | 2.00 | 1.63550 | 23.9 | 27.79 A |
| 18 | 85.837 | 0.20 | | | 27.86 |
| 19 | 63.550 | 4.19 | 1.64040 | 18.9 | 28.00 Aθ |
| 20 | −87.085 | 1.07 | | | 27.95 |
| 21 (Stop) | ∞ | (Variable) | | | 27.35 |
| 22 | −40.162 | 1.50 | 1.67790 | 55.3 | 26.17 |
| 23 | −82.655 | (Variable) | | | 26.49 |
| 24 | 359.184 | 3.43 | 1.61293 | 37.0 | 27.25 |
| 25 | −53.356 | 0.15 | | | 27.29 |
| 26 | −123.752 | 1.60 | 1.84666 | 23.8 | 26.95 |
| 27 | 39.012 | 1.00 | | | 26.70 |
| 28 | 41.103 | 5.21 | 1.51742 | 52.4 | 27.24 |
| 29 | −60.656 | 0.15 | | | 27.38 |
| 30* | 34.827 | 5.29 | 1.51742 | 52.4 | 27.02 |
| 31 | −150.851 | (Variable) | | | 26.36 |
| 32 | 120.387 | 1.35 | 1.88300 | 40.8 | 22.28 |
| 33 | 25.099 | 1.03 | | | 21.44 |
| 34 | 37.152 | 4.82 | 1.72047 | 34.7 | 21.52 |
| 35 | −34.402 | 0.46 | | | 21.43 |
| 36 | −31.521 | 1.35 | 1.77250 | 49.6 | 21.22 |
| 37* | 73.220 | (Variable) | | | 21.19 |
| 38 | −126.760 | 6.90 | 1.61772 | 49.8 | 28.45 |
| 39 | −21.011 | 1.50 | 1.59282 | 68.6 | 28.83 |
| 40 | −811.132 | 54.55 | | | 30.00 |
| Image plane | ∞ | | | | |

Aspherical surface data

Thirtieth surface

K = 0.00000e+000  A4 = −2.63885e−006  A6 = 2.06157e−009
A8 = −3.19310e−011 A10 = 1.32055e−013  A12 = −2.15406e−016

Thirty-seventh surface

K = 0.00000e+000  A4 = −5.17375e−006  A6 = −3.67487e−009
A8 = 4.53339e−012 A10 = −4.48407e−013 A12 = 1.96504e−015

Various data
Zoom ratio 3.78

| | | | | | |
|---|---|---|---|---|---|
| Focal length | 103.00 | 200.04 | 389.14 | 300.23 | 135.01 |
| F number | 4.63 | 5.38 | 5.83 | 5.40 | 5.05 |
| Angle of field (degree) | 11.86 | 6.17 | 3.18 | 4.12 | 9.10 |
| Image height | 21.64 | 21.64 | 21.64 | 21.64 | 21.64 |
| Total lens length | 219.93 | 256.57 | 278.68 | 271.45 | 239.53 |
| BF | 54.55 | 54.55 | 54.55 | 54.55 | 54.55 |
| d6 | 18.36 | 55.11 | 82.79 | 76.31 | 33.62 |
| d13 | 25.64 | 18.19 | 2.00 | 12.11 | 25.07 |
| d21 | 6.45 | 7.67 | 6.53 | 7.22 | 7.18 |
| d23 | 11.78 | 4.35 | 2.58 | 1.75 | 8.10 |
| d31 | 15.95 | 10.32 | 1.93 | 5.15 | 13.06 |
| d37 | 3.62 | 22.81 | 44.71 | 30.76 | 14.38 |

-continued

Unit mm

| | | | | | |
|---|---|---|---|---|---|
| Incident pupil position | 83.19 | 200.45 | 359.19 | 334.60 | 123.13 |
| Exit pupil position | −39.31 | −50.05 | −63.13 | −53.44 | −45.80 |
| Front principal point position | 73.16 | 17.92 | −538.44 | −199.81 | 76.51 |
| Rear principal point position | −48.45 | −145.49 | −334.59 | −245.68 | −80.46 |

Zoom lens unit data

| Unit | First surface | Focal length | Lens structure length | Front principal point position | Rear principal point position |
|---|---|---|---|---|---|
| 1 | 1 | 157.31 | 17.99 | 3.98 | −8.14 |
| SP | 7 | ∞ | 0.00 | 0.00 | −0.00 |
| 2 | 8 | −47.30 | 10.24 | 0.81 | −6.75 |
| 2 | 14 | 71.95 | 17.61 | 4.36 | −8.37 |
| 3 | 22 | −116.90 | 1.50 | −0.86 | −1.76 |
| 5 | 24 | 40.97 | 16.84 | 8.65 | −2.55 |
| 6 | 32 | −44.58 | 9.01 | 3.47 | −2.11 |
| 7 | 38 | −343.08 | 8.40 | −3.04 | −8.32 |

Single lens data

| Lens | First surface | Focal length |
|---|---|---|
| 1 | 1 | −379.87 |
| 2 | 3 | 194.19 |
| 3 | 5 | 252.21 |
| 4 | 8 | −58.60 |
| 5 | 10 | −58.20 |
| 6 | 12 | 77.37 |
| 7 | 14 | 44.17 |
| 8 | 15 | −135.86 |
| 9 | 17 | −53.12 |
| 10 | 19 | 58.00 |
| 11 | 22 | −116.90 |
| 12 | 24 | 76.03 |
| 13 | 26 | −34.88 |
| 14 | 28 | 48.19 |
| 15 | 30 | 55.22 |
| 16 | 32 | −36.15 |
| 17 | 34 | 25.51 |
| 18 | 36 | −28.36 |
| 19 | 38 | 39.78 |
| 20 | 39 | −36.41 |

Numerical Example 3

Unit mm

Surface data

| Surface number | r | d | nd | vd | Effective diameter |
|---|---|---|---|---|---|
| 1 | 54.544 | 2.00 | 1.51742 | 52.4 | 64.05 |
| 2 | 34.054 | 5.36 | | | 55.44 |
| 3* | 59.011 | 2.00 | 1.51633 | 64.1 | 55.34 |
| 4 | 30.637 | 15.77 | | | 48.94 |
| 5* | −92.638 | 2.00 | 1.64040 | 18.9 | 48.71 Aθ |
| 6* | 64.362 | 17.80 | | | 46.95 |
| 7 | 97.336 | 9.72 | 1.63550 | 23.9 | 51.44 A |
| 8 | −91.502 | 0.15 | | | 51.40 |
| 9 | 256.347 | 2.00 | 1.69895 | 30.1 | 49.30 |
| 10 | 68.749 | (Variable) | | | 47.65 |
| 11 | 85.766 | 4.19 | 1.84666 | 23.9 | 47.55 |
| 12 | 170.410 | (Variable) | | | 46.85 |
| 13 | 116.171 | 4.24 | 1.84666 | 23.9 | 45.59 |
| 14 | 1184.915 | 20.84 | | | 44.93 |
| 15 | −48.877 | 2.00 | 1.73800 | 32.3 | 35.66 |
| 16 | 60.833 | 6.84 | 1.48749 | 70.2 | 36.07 |
| 17 | −94.919 | 0.15 | | | 36.45 |
| 18 | 235.878 | 5.97 | 1.67790 | 54.9 | 36.60 |
| 19* | −53.191 | (Variable) | | | 36.54 |
| 20 (Stop) | ∞ | 13.72 | | | 25.63 |
| 21 | 51.507 | 6.63 | 1.75520 | 27.5 | 24.35 |
| 22 | −31.436 | 2.84 | 1.83400 | 37.2 | 24.40 |
| 23 | 34.136 | 22.30 | | | 24.81 |
| 24 | −151.679 | 10.60 | 1.49700 | 81.5 | 41.41 |
| 25 | −29.130 | 0.15 | | | 43.10 |
| 26 | −34.042 | 2.00 | 1.80440 | 39.6 | 43.17 |
| 27 | −52.678 | 1.98 | | | 46.22 |
| 28 | 64.582 | 10.70 | 1.49700 | 81.5 | 52.54 |
| 29 | −171.703 | (Variable) | | | 52.55 |
| 30 | 174.618 | 2.00 | 1.85026 | 32.3 | 51.45 |
| 31 | 39.979 | 13.42 | 1.56907 | 71.3 | 49.56 |
| 32 | −167.332 | 5.05 | | | 49.61 |
| 33 | ∞ | 50.00 | 1.51633 | 64.1 | 48.63 |
| 34 | ∞ | 0.00 | | | 43.92 |
| 35 | ∞ | 36.00 | 1.69680 | 55.5 | 43.92 |
| 36 | ∞ | 2.92 | | | 40.89 |
| Image plane | ∞ | | | | |

Aspherical surface data

Third surface

K = 5.40289e−001   A4 = 2.07793e−006   A6 = 1.42372e−009
A8 = −1.07505e−012   A10 = 1.42901e−015

Fifth surface

K = 0.00000e+000   A4 = 1.42402e−008   A8 = 3.44398e−014
A10 = −6.78266e−018

Sixth surface

K = 0.00000e+000   A4 = −4.36955e−008   A8 = −8.29705e−014
A10 = −1.35653e−016

Nineteenth surface

K = −1.21961e−002   A4 = −1.08345e−007   A6 = 3.50399e−010
A8 = −1.52346e−012   A10 = 1.80738e−015

Various data
Zoom ratio 1.35

| | Wide Angle | Intermediate | Telephoto |
|---|---|---|---|
| Focal length | 27.85 | 32.85 | 37.50 |
| F number | 3.06 | 3.08 | 3.10 |
| Angle of field (degree) | 35.98 | 31.62 | 28.34 |
| Image height | 20.23 | 20.23 | 20.23 |
| Total lens length | 322.00 | 322.00 | 322.00 |
| BF | 2.92 | 2.92 | 2.92 |
| d10 | 7.75 | 3.21 | 3.33 |
| d12 | 30.90 | 16.79 | 1.00 |
| d19 | 1.00 | 17.13 | 30.94 |
| d29 | 1.00 | 3.53 | 5.39 |
| Incident pupil position | 43.62 | 44.44 | 45.71 |
| Exit pupil position | −461.35 | −467.40 | −471.89 |
| Front principal point position | 69.80 | 75.00 | 80.25 |
| Rear principal point position | −24.93 | −29.93 | −34.57 |

Zoom lens unit data

| Unit | First surface | Focal length | Lens structure length | Front principal point position | Rear principal point position |
|---|---|---|---|---|---|
| 1 | 1 | −42.59 | 56.79 | 9.50 | −43.04 |
| 2 | 11 | 199.41 | 4.19 | −2.25 | −4.47 |
| 3 | 13 | 110.42 | 40.05 | 28.28 | −10.22 |
| 4 | 20 | 93.75 | 70.93 | 69.50 | 21.94 |
| 5 | 30 | 758.96 | 106.47 | 19.26 | −49.42 |

-continued

Unit mm

Single lens data

| Lens | First surface | Focal length |
|---|---|---|
| 1 | 1 | −181.23 |
| 2 | 3 | −126.44 |
| 3 | 5 | −59.01 |
| 4 | 7 | 75.73 |
| 5 | 9 | −135.00 |
| 6 | 11 | 199.41 |
| 7 | 13 | 151.85 |
| 8 | 15 | −36.44 |
| 9 | 16 | 77.16 |
| 10 | 18 | 64.57 |
| 11 | 21 | 26.77 |
| 12 | 22 | −19.24 |
| 13 | 24 | 70.52 |
| 14 | 26 | −125.64 |
| 15 | 28 | 95.87 |
| 16 | 30 | −61.40 |
| 17 | 31 | 58.07 |
| 18 | 33 | 0.00 |
| 19 | 35 | 0.00 |

Numerical Example 4

Unit mm

Surface data

| Surface number | r | d | nd | vd | Effective diameter |
|---|---|---|---|---|---|
| 1* | −372.367 | 3.50 | 1.58313 | 59.4 | 50.20 |
| 2 | 16.350 | 3.58 | | | 30.56 |
| 3* | 21.886 | 2.00 | 1.64040 | 18.9 | 30.17 |
| 4* | 19.097 | 11.45 | | | 27.74 |
| 5 | −72.041 | 1.31 | 1.65844 | 50.9 | 24.07 |
| 6 | 21.824 | 0.32 | | | 21.78 |
| 7 | 22.608 | 4.56 | 1.84666 | 23.8 | 21.78 |
| 8 | 65.598 | (Variable) | | | 20.54 |
| 9 | 93.400 | 1.41 | 1.91082 | 35.3 | 9.58 |
| 10 | 10.960 | 3.39 | 1.61293 | 37.0 | 9.71 |
| 11 | −112.950 | 2.00 | | | 10.26 |
| 12 (Stop) | ∞ | 1.21 | | | 11.12 |
| 13 | 23.513 | 3.02 | 1.51742 | 52.4 | 12.08 |
| 14 | −22.430 | (Variable) | | | 12.24 |
| 15 | −55.811 | 0.80 | 1.88300 | 40.8 | 11.50 |
| 16 | 32.040 | 0.15 | | | 11.48 |
| 17 | 24.611 | 2.25 | 1.84666 | 23.8 | 11.58 |
| 18 | 92.214 | (Variable) | | | 11.48 |
| 19 | 31.370 | 4.32 | 1.48749 | 70.2 | 13.63 |
| 20 | −17.201 | 1.00 | 1.80518 | 25.4 | 14.12 |
| 21 | 25.438 | 0.20 | | | 15.42 |
| 22* | 28.353 | 2.39 | 1.64040 | 18.9 | 15.64 Aθ |
| 23* | −226.849 | 0.29 | | | 16.22 |
| 24 | −142.155 | 3.99 | 1.48749 | 70.2 | 16.37 |
| 25 | −17.985 | 0.15 | | | 17.44 |
| 26 | 60.790 | 1.00 | 1.53110 | 55.9 | 18.32 A |
| 27 | 16.576 | 0.05 | | | 18.56 |
| 28 | 16.576 | 6.14 | 1.48749 | 70.2 | 18.66 |
| 29* | −143.986 | (Variable) | | | 19.03 |
| Image plane | ∞ | | | | |

Aspherical surface data

First surface

K = 0.00000e+000   A4 = 2.94704e−005   A6 = −5.82827e−008
A8 = 8.40205e−011   A10 = −6.65910e−014   A12 = 2.46886e−017

-continued

Unit mm

Third surface

K = 0.00000e+000   A4 = 5.60878e−005   A6 = −7.60144e−008
A8 = −4.65255e−011   A10 = −6.09475e−013   A12 = −1.77724e−015

Fourth surface

K = 0.00000e+000   A4 = 6.28598e−005   A6 = 1.26549e−007
A8 = −1.46280e−009   A10 = −1.42785e−012   A12 = 5.23282e−015

Twenty-second surface

K = 0.00000e+000   A4 = 1.05153e−005   A6 = 2.20969e−007
A8 = −5.59498e−010   A10 = −4.52980e−011   A12 = −2.54116e−013

Twenty-third surface

K = 0.00000e+000   A4 = 6.18289e−006   A6 = 9.01131e−009
A8 = 1.64368e−009   A10 = 2.05006e−011   A12 = −1.01968e−012

Twenty-ninth surface

K = 0.00000e+000   A4 = 2.90768e−005   A6 = −5.88992e−008
A8 = 2.76267e−009   A10 = −2.84468e−011   A12 = 1.22038e−013

Various data
Zoom ratio 2.07

| | Wide angle | Intermediate | Telephoto |
|---|---|---|---|
| Focal length | 10.30 | 15.00 | 21.34 |
| F number | 3.50 | 4.60 | 4.60 |
| Angle of field (degree) | 52.98 | 42.32 | 32.62 |
| Image height | 13.66 | 13.66 | 13.66 |
| Total lens length | 126.54 | 121.66 | 123.74 |
| BF | 35.00 | 41.57 | 51.36 |
| d8 | 21.14 | 9.36 | 2.00 |
| d14 | 1.00 | 4.70 | 8.26 |
| d18 | 8.92 | 5.54 | 1.64 |
| d29 | 35.00 | 41.57 | 51.36 |
| Incident pupil position | 17.64 | 16.44 | 15.26 |
| Exit pupil position | −67.46 | −64.55 | −56.34 |
| Front principal point position | 26.91 | 29.32 | 32.37 |
| Rear principal point position | 24.70 | 26.57 | 30.02 |

Zoom lens unit data

| Unit | First surface | Focal length | Lens structure length | Front principal point position | Rear principal point position |
|---|---|---|---|---|---|
| 1 | 1 | −14.87 | 26.72 | 6.96 | −12.12 |
| 2 | 9 | 27.87 | 11.04 | 8.67 | 1.20 |
| 3 | 15 | −55.22 | 3.20 | 0.46 | −1.32 |
| 4 | 19 | 39.34 | 19.53 | 9.51 | −3.95 |

Single lens data

| Lens | First surface | Focal length |
|---|---|---|
| 1 | 1 | −26.77 |
| 2 | 3 | −324.90 |
| 3 | 5 | −25.30 |
| 4 | 7 | 38.86 |
| 5 | 9 | −13.75 |
| 6 | 10 | 16.47 |
| 7 | 13 | 22.69 |
| 8 | 15 | −22.95 |
| 9 | 17 | 39.06 |
| 10 | 19 | 23.47 |
| 11 | 20 | −12.61 |
| 12 | 22 | 39.50 |
| 13 | 24 | 41.80 |
| 14 | 26 | −43.25 |
| 15 | 28 | 30.88 |

Numerical Example 5

Unit mm

Surface data

| Surface number | r | d | nd | vd | Effective diameter |
|---|---|---|---|---|---|
| 1* | −389.156 | 3.50 | 1.58313 | 59.4 | 50.20 |
| 2 | 17.048 | 3.32 | | | 31.18 |
| 3* | 34.838 | 2.00 | 1.64040 | 18.9 | 30.79 |
| 4* | 26.062 | 12.14 | | | 27.46 |
| 5 | −56.579 | 1.31 | 1.65844 | 50.9 | 23.53 |
| 6 | 25.399 | 0.27 | | | 21.60 |
| 7 | 26.084 | 3.72 | 1.84666 | 23.8 | 21.60 |
| 8 | 94.316 | (Variable) | | | 20.76 |
| 9 | 51.845 | 1.41 | 1.91082 | 35.3 | 9.78 |
| 10 | 10.841 | 3.28 | 1.61293 | 37.0 | 9.81 |
| 11 | 1648.332 | 2.00 | | | 10.25 |
| 12 (Stop) | ∞ | 1.24 | | | 11.00 |
| 13 | 23.683 | 2.96 | 1.51742 | 52.4 | 11.93 |
| 14 | −22.690 | (Variable) | | | 12.09 |
| 15 | −60.281 | 0.80 | 1.88300 | 40.8 | 11.37 |
| 16 | 27.442 | 0.15 | | | 11.33 |
| 17 | 24.399 | 2.13 | 1.84666 | 23.8 | 11.41 |
| 18 | 139.226 | (Variable) | | | 11.35 |
| 19 | 30.528 | 4.43 | 1.48749 | 70.2 | 14.75 |
| 20 | −20.435 | 1.00 | 1.80518 | 25.4 | 15.21 |
| 21 | 25.377 | 0.20 | | | 16.44 |
| 22* | 30.342 | 2.46 | 1.63550 | 23.9 | 16.67 A |
| 23* | −53.965 | 0.28 | | | 16.92 |
| 24 | −52.094 | 2.65 | 1.48749 | 70.2 | 17.02 |
| 25 | −28.914 | 0.15 | | | 17.91 |
| 26 | 197.311 | 1.00 | 1.49866 | 43.1 | 18.58 Aθ |
| 27 | 17.673 | 0.05 | | | 19.36 |
| 28 | 17.673 | 7.51 | 1.48749 | 70.2 | 19.53 |
| 29* | −32.740 | (Variable) | | | 20.26 |
| Image plane | ∞ | | | | |

Aspherical surface data

First surface

K = 0.00000e+000  A4 = 2.86394e−005  A6 = −5.69472e−008
A8 = 8.46323e−011  A10 = −6.91093e−014  A12 = 2.64754e−017

Third surface

K = 0.00000e+000  A4 = 9.01824e−005  A6 = −6.68018e−008
A8 = −1.49075e−011  A10 = −5.39157e−013  A12 = −1.02385e−015

Fourth surface

K = 0.00000e+000  A4 = 1.01330e−004  A6 = 2.25259e−007
A8 = −1.29504e−009  A10 = −1.14361e−012  A12 = 3.26356e−015

Twenty-second surface

K = 0.00000e+000  A4 = 1.79686e−005  A6 = 3.43912e−007
A8 = 1.04995e−009  A10 = −4.90873e−011  A12 = −4.35795e−014

Twenty-third surface

K = 0.00000e+000  A4 = 3.15368e−006  A6 = 1.31291e−007
A8 = 1.54175e−009  A10 = 3.97578e−011  A12 = −9.15449e−013

Twenty-ninth surface

K = 0.00000e+000  A4 = 2.88258e−005  A6 = −5.85339e−008
A8 = 2.72191e−009  A10 = −2.31260e−011  A12 = 9.54498e−014

Various data
Zoom ratio 2.07

| | Wide angle | Intermediate | Telephoto |
|---|---|---|---|
| Focal length | 10.30 | 15.15 | 21.34 |
| F number | 3.50 | 4.60 | 4.60 |
| Angle of field (degree) | 52.98 | 42.03 | 32.62 |
| Image height | 13.66 | 13.66 | 13.66 |
| Total lens length | 128.11 | 122.58 | 124.03 |
| BF | 35.00 | 41.57 | 51.36 |
| d8 | 21.65 | 9.33 | 2.00 |
| d14 | 1.00 | 5.50 | 9.08 |
| d18 | 10.50 | 6.22 | 1.64 |
| d29 | 35.00 | 41.57 | 51.36 |
| Incident pupil position | 17.44 | 16.22 | 15.08 |
| Exit pupil position | −88.82 | −81.91 | −65.70 |
| Front principal point position | 26.89 | 29.51 | 32.53 |
| Rear principal point position | 24.70 | 26.42 | 30.02 |

Zoom lens unit data

| Unit | First surface | Focal length | Lens structure length | Front principal point position | Rear principal point position |
|---|---|---|---|---|---|
| 1 | 1 | −14.92 | 26.26 | 6.65 | −12.61 |
| 2 | 9 | 27.87 | 10.89 | 8.12 | 0.38 |
| 3 | 15 | −55.22 | 3.08 | 0.23 | −1.49 |
| 4 | 19 | 39.34 | 19.73 | 10.60 | −3.40 |

Single lens data

| Lens | First surface | Focal length |
|---|---|---|
| 1 | 1 | −27.92 |
| 2 | 3 | −177.34 |
| 3 | 5 | −26.46 |
| 4 | 7 | 41.55 |
| 5 | 9 | −15.30 |
| 6 | 10 | 17.79 |
| 7 | 13 | 22.89 |
| 8 | 15 | −21.27 |
| 9 | 17 | 34.65 |
| 10 | 19 | 25.85 |
| 11 | 20 | −13.92 |
| 12 | 22 | 30.91 |
| 13 | 24 | 128.49 |
| 14 | 26 | −39.00 |
| 15 | 28 | 24.75 |

Although the exemplary embodiments of the present invention have been described above, the present invention is not limited to the embodiments described above. Various modifications and changes are possible within the scope of the gist of the invention. Table 1 shows optical characteristics of the materials used in the embodiments. Table 2 shows numerical values corresponding to Conditional Expressions (1) to (5) for Numerical Expressions.

TABLE 1

| | Thermoplastic resin 1 | Thermoplastic resin 2 | Thermoplastic resin 3 | Thermoplastic resin 4 |
|---|---|---|---|---|
| nd | 1.64039 | 1.63552 | 1.53110 | 1.49866 |
| vd | 18.89 | 23.97 | 55.91 | 43.07 |
| θgF | 0.6962 | 0.6357 | 0.5684 | 0.5100 |
| ΔθgF | 0.0577 | 0.0158 | 0.0230 | −0.0577 |
| ΔNav | −1.25E−04 | −1.10E−04 | −9.50E−05 | −1.30E−04 |

TABLE 2

|  | First Embodiment | Second Embodiment | Third Embodiment | Fourth Embodiment | Fifth Embodiment |
|---|---|---|---|---|---|
| Conditional Expression (1) (A) | −1.10E−04 | −1.10E−04 | −1.10E−04 | −9.50E−05 | −1.10E−04 |
| Conditional Expression (1) (Aθ) | −1.25E−04 | −1.25E−04 | −1.25E−04 | −1.25E−04 | −1.30E−04 |
| Conditional Expression (2) | 0.0577 | 0.0577 | 0.0577 | 0.0577 | 0.0577 |
| Conditional Expression (3) | 0.83 | 0.81 | 1.39 | 1.00 | 0.99 |
| Conditional Expression (4) | −0.82 | −1.03 | −0.69 | −1.09 | −0.84 |
| Conditional Expression (5) | 5.1 | 5.1 | 5.1 | 37.0 | 19.1 |

Figure 22:
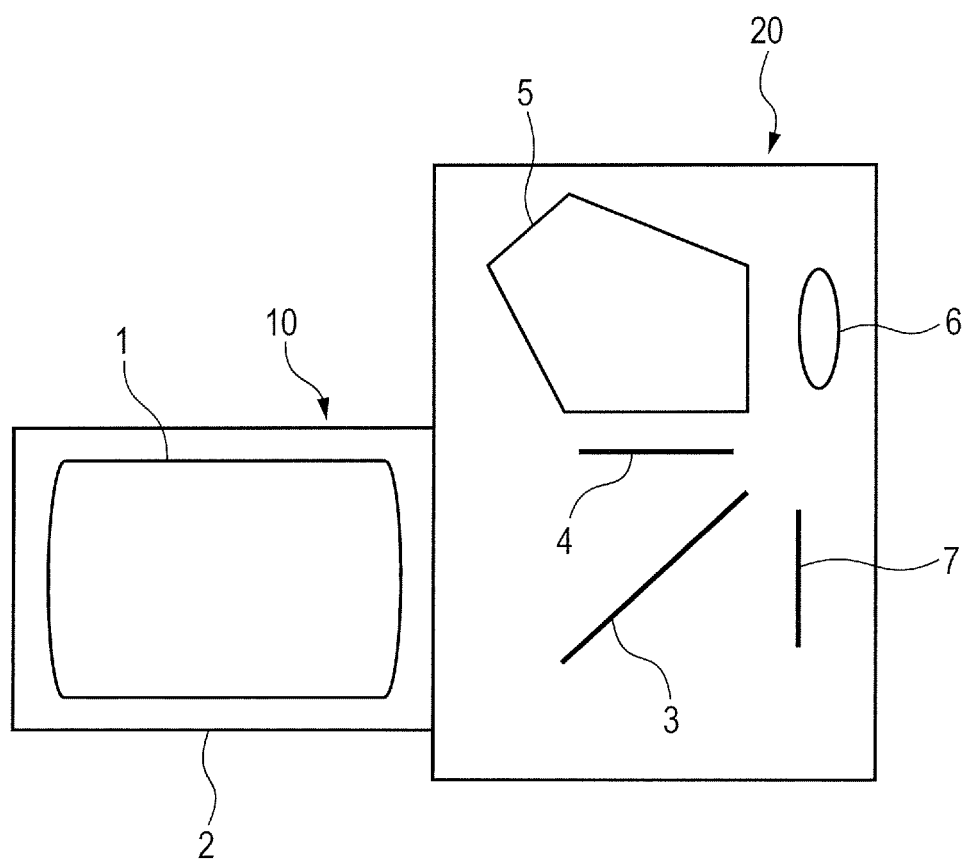
FIG. 22 is a schematic view of a principal part of an image pickup device according to the present invention.

Next, an embodiment in which the zoom lens according to the present invention is applied to an image pickup device (camera system) as one of optical apparatus is described referring to FIG. 22.

FIG. 22 is a schematic view of a principal part of a single-lens reflex camera. FIG. 22 illustrates an image pickup lens (image pickup optical system) 10 including a zoom lens 1 of any one of the first to fifth embodiments. The image pickup optical system 10 is held by a lens tube 2 which is a holder member. FIG. 22 also illustrates a camera main body 20. The camera main body 20 includes an instant return mirror 3 for reflecting a light flux from the image pickup lens 10 upward, a focusing screen 4 located at an image formation position on the image pickup lens 10, and a penta-dach prism 5 for converting an inverse image formed on the focusing screen 4 into an erected image. Further, the camera main body 20 further includes an ocular lens 6 for observing the erected image and the like.

The camera main body 20 also includes a photosensitive surface 7, on which a solid image pickup element (photo-electric conversion element) such as a CCD sensor or a CMOS sensor and a silver halide film are to be provided. At the time of photographing, the instant return mirror 3 retracts from a light path, so that an image is formed by the image pickup lens 10 on the photosensitive surface 7. In this manner, by applying the zoom lens according to the first to fifth embodiments to an image pickup device such as a photo-graphing camera, a video camera, or a digital still camera, the image pickup device having excellent optical characteristics and the effect of correcting the chromatic aberrations is realized. Moreover, in comparison with an image pickup optical system using a conventional optical element made of an organic material, a change in optical performance due to an environmental change, in particular, a temperature change, is reduced.

The present invention is also applicable to a single-lens reflex camera without an instant return mirror. Moreover, the present invention is also applicable to a projection lens of an optical apparatus such as a projector in a similar manner.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-144453, filed Jul. 10, 2013, which is hereby incorporated by reference herein in its entirety.

What is claimed is:

1. A zoom lens, comprising multiple lens units in which a distance between adjacent ones of the multiple lens units changes for zooming, wherein:

when an average value of a change in refractive index with respect to a temperature change within a temperature range of from 0° C. to 40° C. is ΔNav, at least one lens unit L of the multiple lens units comprises multiple optical elements A made of materials satisfying the following conditional expression:

$|\Delta Nav| > 5.0 \times 10^{-5}$;

when an anomalous partial dispersion ratio for a g-line and an F-line is $\Delta\theta gF_{A\theta}$, at least one optical element $A_\theta$ of the multiple optical elements A satisfies the following conditional expression:

$|\Delta\theta gF_{A\theta}| > 0.0272$; and when i indicates an order of the at least one optical element $A_\theta$ in the at least one lens unit L counted from a light incident side, an i-th optical element $A_\theta$ in the at least one lens unit L counted from the light incident side is an i-th optical element, j indicates an order of the multiple optical elements A in the at least one lens unit L counted from the light incident side, a j-th optical element A in the at least one lens unit L counted from the light incident side is a j-th optical element, a focal length of the i-th optical element is fi, a focal length of the at least one lens unit L is fL, an average value of a change in a refractive power φpj of a positive lens of the j-th optical element with respect to the temperature change within the temperature range of from 0° C. to 40° C. is Δφpj, and an average value of a change in a refractive power φnj of a negative lens of the j-th optical element with respect to the temperature change within the temperature range of from 0° C. to 40° C. is Δφnj, the following conditional expressions are satisfied:

$|1/(\Sigma(1/fi) \times fL)| < 2.2$; and $-1.5 < \Sigma(\Delta\phi pj)/\Sigma(\Delta\phi nj) < -0.66$.

2. A zoom lens according to claim 1, wherein, when an equivalent Abbe number of a material of the positive lens of the j-th optical element is νp and an equivalent Abbe number of a material of the negative lens of the j-th optical element is νn, the following conditional expression is satisfied:

$|\nu - \nu n| < 38$.

3. A zoom lens according to claim 1, wherein, when a refractive index of the materials at a d-line is nd, and an Abbe number of the materials is νd, a material of at least one optical element of the multiple optical elements A and a material of the at least one optical element $A_\theta$ both satisfy the following conditional expressions:

$$nd < 6.667 \times 10^{-4} vd^2 - 5.000 \times 10^{-2} vd + 2.533 \text{ (when } vd \leq 35\text{); and}$$

$$nd < 1.6 \text{ (when } vd > 35\text{)}.$$

4. A zoom lens according to claim 1, further comprising an aperture stop, wherein:
   a first lens unit among the multiple lens units counted from the light incident side to a light emitting side has a negative refractive power; and
   the optical element $A_\theta$ is located on the light incident side of the aperture stop.

5. A zoom lens according to claim 1, further comprising an aperture stop, wherein:
   a first lens unit among the multiple lens units counted from the light incident side to a light emitting side has a negative refractive power; and
   the optical element $A_\theta$ is located on the light emitting side of the aperture stop.

6. A zoom lens according to claim 1, further comprising an aperture stop, wherein:
   a first lens unit among the multiple lens units counted from the light incident side to a light emitting side has a positive refractive power; and
   the optical element $A_\theta$ is located on the light incident side of the aperture stop.

7. A zoom lens according to claim 1, wherein:
   the multiple lens units comprise a first lens unit having a negative refractive power, a second lens unit having a positive refractive power, a third lens unit having a negative refractive power, and a fourth lens unit having a positive refractive power in the stated order from the light incident side to a light emitting side;
   each of the first lens unit to the fourth lens unit moves for zooming; and
   the at least one lens unit L comprises the fourth lens unit.

8. A zoom lens according to claim 1, wherein:
   the multiple lens units comprise a first lens unit having a positive refractive power, a second lens unit having a negative refractive power, a third lens unit having a positive refractive power, a fourth lens unit having a negative refractive power, a fifth lens unit having a positive refractive power, a sixth lens unit having a negative refractive power, and a seventh lens unit having a negative refractive power in the stated order from the light incident side to a light emitting side;
   each of the first lens unit to the seventh lens unit moves for zooming; and
   the at least one lens unit L comprises the third lens unit.

9. A zoom lens according to claim 1, wherein:
   the multiple lens units comprise a first lens unit having a negative refractive power, a second lens unit having a positive refractive power, a third lens unit having a positive refractive power, a fourth lens unit having a positive refractive power, and a fifth lens unit having a positive refractive power in the stated order from the light incident side to a light emitting side;
   each of the second lens unit, the third lens unit, and the fourth lens unit moves for zooming; and
   the at least one lens unit L comprises the first lens unit.

10. An optical apparatus, comprising:
    a zoom lens; and
    an image pickup element, which receives light from the zoom lens,
    wherein the zoom lens comprises multiple lens units in which a distance between adjacent ones of the multiple lens units changes for zooming, wherein:
    when an average value of a change in refractive index with respect to a temperature change within a temperature range of from 0° C. to 40° C. is ΔNav, at least one lens unit L of the multiple lens units comprises multiple optical elements A made of materials satisfying the following conditional expression:

$$|\Delta Nav| > 5.0 \times 10^{-5};$$

when an anomalous partial dispersion ratio for a g-line and an F-line is $\Delta\theta gF_{A\theta}$, at least one optical element $A_\theta$ of the multiple optical elements A satisfies the following conditional expression:

$$|\Delta\theta gF_{A\theta}| > 0.0272; \text{ and}$$

when i indicates an order of the at least one optical element $A_\theta$ in the at least one lens unit L counted from a light incident side, an i-th optical element $A_\theta$ in the at least one lens unit L counted from the light incident side is an i-th optical element, j indicates an order of the multiple optical elements A in the at least one lens unit L counted from the light incident side, a j-th optical element A in the at least one lens unit L counted from the light incident side is a j-th optical element, a focal length of the i-th optical element is fi, a focal length of the at least one lens unit L is fL, an average value of a change in a refractive power φpj of a positive lens of the j-th optical element with respect to the temperature change within the temperature range of from 0° C. to 40° C. is Δφpj, and an average value of a change in a refractive power φnj of a negative lens of the j-th optical element with respect to the temperature change within the temperature range of from 0° C. to 40° C. is Δφnj, the following conditional expressions are satisfied:

$$|1/(\Sigma(1/fi) \times fL)| < 2.2; \text{ and}$$

$$-1.5 < \Sigma(\Delta\phi pj)/\Sigma(\Delta\phi nj) < -0.66.$$

11. An optical apparatus, comprising:
    an image display element; and
    a zoom lens, which receives light from the image display element,
    wherein the zoom lens comprises multiple lens units in which a distance between adjacent ones of the multiple lens units changes for zooming, wherein:
    when an average value of a change in refractive index with respect to a temperature change within a temperature range of from 0° C. to 40° C. is ΔNav, at least one lens unit L of the multiple lens units comprises multiple optical elements A made of materials satisfying the following conditional expression:

$$|\Delta Nav| > 5.0 \times 10^{-5};$$

when an anomalous partial dispersion ratio for a g-line and an F-line is $\Delta\theta gF_{A\theta}$, at least one optical element $A_\theta$ of the multiple optical elements A satisfies the following conditional expression:

$$|\Delta\theta gF_{A\theta}| > 0.0272; \text{ and}$$

when i indicates an order of the at least one optical element $A_\theta$ in the at least one lens unit L counted from a light incident side, an i-th optical element $A_\theta$ in the at least one lens unit L counted from the light incident side is an i-th optical element, j indicates an order of the multiple optical elements A in the at least one lens unit L counted from the light incident side, a j-th optical element A in the at least one lens unit L counted from the light incident side is a j-th optical element, a focal length of the i-th optical element is fi, a focal length of the at least one lens unit L is fL, an average value of a change in a refractive power $\phi pj$ of a positive lens of the j-th optical element with respect to the temperature change within the temperature range of from 0° C. to 40° C. is $\Delta\phi pj$, and an average value of a change in a refractive power $\phi nj$ of a negative lens of the j-th optical element with respect to the temperature change within the temperature range of from 0° C. to 40° C. is $\Delta\phi nj$, the following conditional expressions are satisfied:

$|1/(\Sigma(1/fi) \times fL)| < 2.2$; and $-1.5 < \Sigma(\Delta\phi pj)/\Sigma(\Delta\phi nj) < -0.66$.

* * * * *